United States Patent
Dandekar et al.

(10) Patent No.: US 8,750,315 B2
(45) Date of Patent: Jun. 10, 2014

(54) EFFICIENTLY STORING TRANSPORT STREAMS

(75) Inventors: Shirish Dandekar, Hopkinton, MA (US); Craig Frink, Chelmsford, MA (US); Santosh Krishnan, Windham, NH (US); Weidong Xu, Westford, MA (US); Qin-Fan Zhu, Acton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 79 days.

(21) Appl. No.: 12/359,255

(22) Filed: Jan. 23, 2009

(65) Prior Publication Data
US 2010/0189122 A1 Jul. 29, 2010

(51) Int. Cl.
*H04L 12/28* (2006.01)
*H04L 12/54* (2013.01)
*H04J 3/24* (2006.01)
*H04H 20/28* (2008.01)
*H04L 29/06* (2006.01)
*H04L 29/08* (2006.01)

(52) U.S. Cl.
CPC .......... *H04L 65/605* (2013.01); *H04L 12/5694* (2013.01); *H04L 67/2842* (2013.01)
USPC ....... 370/395.61; 370/428; 370/474; 370/487

(58) Field of Classification Search
None
See application file for complete search history.

(56) References Cited

U.S. PATENT DOCUMENTS

| | | | |
|---|---|---|---|
| 4,092,732 A | 5/1978 | Ouchi | |
| 5,148,432 A | 9/1992 | Gordon et al. | |
| 5,412,661 A | 5/1995 | Hao et al. | |
| 5,473,362 A | 12/1995 | Fitzgerald | |
| 5,541,852 A * | 7/1996 | Eyuboglu et al. | 709/232 |
| 5,805,804 A | 9/1998 | Laursen et al. | |
| 5,862,312 A | 1/1999 | Mann et al. | |
| 5,878,220 A | 3/1999 | Olkin et al. | |
| 5,926,649 A | 7/1999 | Ma et al. | |

(Continued)

FOREIGN PATENT DOCUMENTS

| | | |
|---|---|---|
| EP | 0 713 184 | 5/1996 |
| EP | 0 805 593 | 11/1997 |

(Continued)

OTHER PUBLICATIONS

Chen, P., et al. "RAID: High-Performance, Reliable Secondary Storage," ACM Computing Surveys, 69 pages (1994).

(Continued)

*Primary Examiner* — Faruk Hamza
*Assistant Examiner* — Cassandra Decker
(74) *Attorney, Agent, or Firm* — Joshua T. Matt

(57) ABSTRACT

Described are computer-based methods and apparatuses, including computer program products, for efficiently storing transport streams. A first sequence of one or more packets associated with the first transport stream is received, the first sequence comprising one or more data packets. A storage packet is generated by selecting one or more packets from the first sequence, the storage packet comprising a packet header and the one or more data packets. One or more null packet insertion locations are identified in a second sequence of one or more packets associated with a second transport stream. Null packet insertion information is generated based on the one or more null packet insertion locations, the information including data indicative of a reconstruction parameter related to reconstructing the second sequence from the storage packet by inserting one or more null packets that are not stored in the storage packet, wherein the packet header includes the null packet insertion information. The storage packet is stored.

16 Claims, 17 Drawing Sheets

(56) References Cited

U.S. PATENT DOCUMENTS

| | | |
|---|---|---|
| 5,982,418 A | 11/1999 | Ely |
| 6,011,798 A | 1/2000 | McAlpine |
| 6,070,172 A | 5/2000 | Lowe |
| 6,401,126 B1 | 6/2002 | Douceur et al. |
| 6,430,159 B1* | 8/2002 | Wan et al. ............... 370/246 |
| 6,577,620 B1* | 6/2003 | Galyas et al. ............ 370/352 |
| 6,578,093 B1 | 6/2003 | Armen et al. |
| 6,606,112 B1 | 8/2003 | Falco |
| 6,771,657 B1* | 8/2004 | Elstermann ............... 370/465 |
| 6,879,768 B1* | 4/2005 | Ono et al. ................ 386/241 |
| 7,292,583 B2* | 11/2007 | Schoenblum ........... 370/395.64 |
| 7,349,386 B1* | 3/2008 | Gou ........................ 370/356 |
| 7,486,680 B1* | 2/2009 | Zhang et al. ............ 370/395.4 |
| 2006/0215648 A1* | 9/2006 | Jen .......................... 370/389 |
| 2007/0189315 A1* | 8/2007 | Aoyanagi ................. 370/412 |
| 2009/0182790 A1 | 7/2009 | Hluchyj et al. |
| 2009/0182939 A1 | 7/2009 | Hluchyj et al. |
| 2009/0217318 A1 | 8/2009 | VerSteeg et al. |
| 2010/0008385 A1* | 1/2010 | Noronha, Jr. ............. 370/545 |

FOREIGN PATENT DOCUMENTS

| | | |
|---|---|---|
| EP | 1 365 587 | 11/2003 |
| EP | 1 729 300 | 12/2006 |
| WO | WO 98/54646 | 12/1998 |
| WO | WO 02/08917 | 1/2002 |

OTHER PUBLICATIONS

Narashimha Reddy, A.L., et al. "An Evaluation of Multiple-Disk I/O Systems," IEEE Transactions on Computers, vol. 38, No. 12, Dec. 1989, 11 pages.

Patterson, D. et al. "A Case for Redundant Arrays of Inexpensive Disks (RAID)," ACM, 1988, 8 pages.

Carretero, J., et al., "A hierarchical disk scheduler for multimedia systems," Future Generations Computer Systems, Elsevier Science Publisher. Amsterdam, NL, vol. 19, No. 1, Jan. 1, 2003, pp. 23-35.

Mourad, A., "Issues in the design of a storage server for video-on-demand," Multimedia Systems, ACM, New York, NY, US, 4:70-86 (1996).

Zhang, Y., et al., "Integrated Rate Control and Buffer Management for Scalable Video Streaming," *IEEE*, 248-251 (2007).

Zhang, Y., et al., "Joint Rate Allocation and Buffer Management for Robust Transmission of VBR Video," *Acta Automatica Sinica*, 34(3):337-343(2008).

\* cited by examiner

EFFICIENTLY STORING TRANSPORT STREAMS

FIELD OF THE INVENTION

The present invention relates generally to computer-based methods and apparatuses, including computer program products, for efficiently storing transport streams, and more specifically to efficiently storing MPEG-2 transport streams for constant bit rate and variable bit rate delivery.

BACKGROUND

Coded video (e.g., MPEG-2 (for Moving Picture Experts Group) and H.264/AVC (for Advanced Video Coding)) is used in Digital Television (DTV) networks for Broadcast Television and On-Demand video. The digital format enables the coded video to be displayed on a television (e.g., cathode ray tube (CRT), liquid crystal display (LCD), and Plasma) once decoded, as well as downloaded and saved to a disk drive for display at a later time (e.g., on a computer, Digital Recorder, etc). When a program is coded, its video and audio are separated into Elementary Streams (ES). Each ES is segmented into packets that form a Packetized Elementary Stream (PES). In order to transport and display the video in real-time, the PES is further segmented and encapsulated by an MPEG-2 Transport Stream (TS). The MPEG-2 TS contains timing information (i.e., Program Clock Reference (PCR), Presentation Time-Stamp (PTS), and Decode Time-Stamp (DTS)) that is used by a video decoder to synchronize with an encoder. Timing information is also used to transport video across Quadrature Amplitude Modulation (QAM) Networks (such as in Cable TV), over Data Over Cable Service Interface Specification (DOCSIS) (e.g., in an Internet Protocol Television (IPTV) deployment), and over Layer-2 Packet Networks that often form the infrastructure connecting video elements together.

The MPEG-2 Transport Stream (TS) consists of fixed size 188-byte packets, each with a 4-byte header that describes the 184-byte TS payload. The TS Header includes a 13-bit Program ID (PID) that is used to uniquely identify each TS packet and payload. The MPEG-2 TS is able to carry many different programs simultaneously. When multiple programs are present in the TS, the TS is called a Multiple Program Transport Stream (MPTS). A Single Program Transport Stream (SPTS) carries only a single program. In addition to carrying the video and audio PES, the TS also carries program specific information that is contained in a Program Association Table (PAT) and a Program Mapping table (PMT). These associate the PID with the actual program.

When an MPEG-2 TS is carried across a Packet Network (e.g., Layer-2 or Layer-3), the MPEG-2 TS is sometimes encapsulated with the Real-time Transport Protocol (RTP). RTP provides a means for assigning a Timestamp that can be used for timing the transmission of Packets through a Network, such as from a Video Server to a Video or Edge QAM in a Cable TV network. The RTP Timestamp has a fixed relationship to the PCR/PTS/DTS in the MPEG-2 TS, which is used to avoid overrunning or under-running a buffer at the receiver (e.g., Set Top Box (STB)). Anytime the relationship between the video and RTP Timestamp in the RTP packet is changed (e.g., repacketizing) the RTP Timestamp needs to be recomputed based on the PCR in the MPEG-2 TS.

Transport Streams (TS) may be of a Variable Bit Rate (VBR) or a Constant Bit Rate (CBR). In a VBR stream the rate can vary over time, generally up to a "peak" or "capped" rate. Although the rate of a VBR stream may vary, the video and audio must maintain a fixed relationship to its TS timing to correctly decode and display the video and audio (e.g., without underflow or overflow of its decoder buffer). A CBR stream can be transmitted in a similar manner to maintain its timing relationships, but at a constant rate that is maintained by inserting TS Null packets (PID 0x1FFF) into the stream when no video is present. CBR is used, for example, in Cable TV deployments where QAM channels are used to carry the video and audio. VBR is used, for example, in IPTV deployments, where the MPEG-2 TS is carried across IP Networks (including over DOCSIS in a Cable TV deployment, which also uses one or more QAMs).

The timing relationship between the coded audio and video, and the PCR/PTS/DTS in the MPEG-2 TS, is similar whether the video is transported as VBR or CBR. From a decoder perspective, the video and audio should be available in its decoder buffer at the correct time in order to be correctly displayed. If, for example, the video or audio arrives too early then the decoder buffer may overfill and data will be lost. If the video or audio arrives too late, the buffer may underflow and the video may miss its decoder frame time (e.g., DTS/PTS at 30 fps) and the decoder will need to repeat a previous frame on the display.

When an MPTS that is coded as CBR is received (e.g., from a video server) and the program elements need to be separated into multiple individual SPTS, all TS Null packets in the MPTS are removed. Since the TS Null packets have a common PID (0x1FFF), it is not possible to associate them with any particular SPTS. So they are discarded before storing the SPTS to a buffer. If the MPTS is carried using RTP, the Timestamp can be used when creating RTP Packets for each SPTS, if the timing relationship is maintained. If the inter-packet timing relationship is changed, then a new RTP Timestamp is computed using the PCR in the MPEG-2 TS.

FIG. 1 is an exemplary diagram 100 of the prior art illustrating MPTS packets of MPTS 101 carried using RTP (e.g., received from a network). Diagram 100 includes MPTS Pkt #0 102A, MPTS Pkt #1 102B, MPTS Pkt #2 102C, MPTS Pkt #3 102D, MPTS Pkt #4 102E, MPTS Pkt #5 102F, and MPTS Pkt #6 102G (collectively MPTS Pkts 102). Each of the MPTS Pkts 102 includes an RTP header (e.g., RTP header 104A through RTP header 104G, collectively RTP headers 104). MPTS PKT #0 102A includes PCR timestamps 106A, 106B, 106C and 106D. MPTS PKT #5 102F includes PCR timestamps 106E, 106F, 106G, and 106H.

MPTS PKT #0 102A includes SPTS A, #0 (i.e., SPTS for stream A, packet number 0), SPTS B, #0, SPTS C, #0, SPTS D, #0, SPTS D, #1, SPTS D, #2, and SPTS D, #3. MPTS PKT #1 102B includes SPTS B, #1, SPTS B, #2, SPTS B, #3, SPTS A, #1, SPTS A, #2, and SPTS A, #3. MPTS PKT #2 102C includes SPTS C, #1, SPTS B, #4, SPTS B, #5, SPTS D, #4, SPTS D, #5, SPTS D, #6, and SPTS D, #7. MPTS PKT #3 102D includes SPTS C, #2, SPTS C, #3, SPTS C, #4, SPTS C, #5, SPTS C, #6, SPTS A, #4, and SPTS A, #5. MPTS PKT #4 102E includes SPTS C, #7, SPTS C, #8, SPTS B, #6, SPTS B, #7, SPTS B, #8, SPTS A, #6, and SPTS A, #7. MPTS PKT #5 102F includes SPTS A, #8, SPTS B, #9, SPTS C, #9, SPTS D, #8, SPTS A, #9, SPTS A, #10, and SPTS B, #10. MPTS PKT #6 includes SPTS C, #10, SPTS B, #11, SPTS D, #9, and SPTS A, #11.

MPTS 101 includes packets multiplexed from four SPTSs, SPTS A 108A, SPTS 108B, SPTS 108C, and SPTS 108D, collectively SPTSs 108. SPTS A 108A includes RTP headers 110A, 110B, and 110C. STPS A 108A includes PCR timestamp 106A and PCR timestamp 106E. SPTS A 108A includes packets SPTS A, #1, SPTS A, #2, SPTS A, #3, SPTS A, #4, SPTS A, #5, SPTS A, #6, SPTS A, #7, SPTS A, #8, SPTS A,

9, SPTS A, #10, and SPTS A, #11. SPTS B 108B includes RTP headers 112A, 112B, and 112C. STPS B 108B includes PCR timestamp 106B and PCR timestamp 106F. SPTS B 108B includes packets SPTS B, #1, SPTS B, #2, SPTS B, #3, SPTS B, #4, SPTS B, #5, SPTS B, #6, SPTS B, #7, SPTS B, #8, SPTS B, #9, SPTS B, #10, and SPTS B, #11.

SPTS C 108C includes RTP headers 114A, 114B, and 114C. STPS C 108C includes PCR timestamp 106C and PCR timestamp 106G. SPTS C 108C includes packets SPTS C, #1, SPTS C, #2, SPTS C, #3, SPTS C, #4, SPTS C, #5, SPTS C, #6, SPTS C, #7, SPTS C, #8, SPTS C, #9, and SPTS C, #10. SPTS D 108D includes RTP headers 116A, 116B, and 116C. STPS D 108D includes PCR timestamp 106D and PCR timestamp 106H. SPTS D 108D includes packets SPTS D, #1, SPTS D, #2, SPTS D, #3, SPTS D, #4, SPTS D, #5, SPTS D, #6, SPTS D, #7, SPTS D, #8, and SPTS D, #9.

SPTSs 108 can be multiplexed into MPTS 101, and/or demultiplexed from MPTS 101 to SPTSs 108. MPTS 101 can be transported, for example, as CBR or VBR. For example, for CBR, TS Null packets (not shown) are inserted during multiplexing to maintain the MPTS rate, and the TS Null packets are discarded as each SPTS is de-multiplexed. The RTP Timestamp is recomputed as needed based on the PCR in each SPTS.

Like the MPTS 101, an SPTS (e.g., received from a network using RTP) can be transported as CBR or VBR. Unlike MPTS 101, an SPTS includes data for a single program. The RTP Timestamps of the SPTS can be computed based on the PCR in the MPEG-2 TS. Since the SPTS contains only a single video PES, the TS Null packets can be maintained to preserve the transport bit rate (i.e., the CBR). When the RTP Packets for the SPTS are received and stored, the MPEG-2 TS Null packets can be stored with the TS packets for the audio and video PES. The RTP Timestamp may also be preserved to avoid regeneration when the video is transmitted.

FIG. 2 is an exemplary diagram 120 of the prior art illustrating RTP packets for a SPTS, the RTP packets including one or more TS Null packets. Diagram 120 includes RTP packets 122A, 122B, and 122C, collectively RTP packets 122. Each of the RTP packets 122 includes an RTP header 124A, 124B, and 124C, respectively. RTP packet 122A includes TS packets TS 0, TS 1, TS 2, and TS 3. RTP packet 122A includes TS Null packets 126A, 126B, and 126C, collectively TS Null packets 126. RTP packet 122B includes TS 4, TS 5, TS 6, and TS 7. RTP packet 122B includes TS Null packets 128A, 128B, and 128C, collectively TS Null packets 128. RTP packet 122C includes TS 8, TS 9, TS 10, TS 11, TS 12, and TS 13. RTP packet 122C includes TS Null packet 130. The SPTS RTP packets 122 are received from the network and stored with the TS Null packets included.

Video that is coded and transported as CBR is generally done so for the convenience of the transmission system (e.g., QAM), as well as the receiver (e.g., STB). Since there are variations in image complexity of coded video, the coded information rate can vary over time. As such, a CBR stream may contain MPEG-2 TS Null packets (e.g., TS Null packets 126, 128, and 130) to fill in the SPTS when there is not enough video to maintain the CBR. Depending on the ratio of average to peak rate (i.e., the CBR) in the video stream, Null packets may account for 10% to 20% of the SPTS packets. For example, the SPTS of diagram 120 includes fourteen TS packets (TS 0 through TS 13) and seven TS Null packets (TS Null packets 126, 128, and 130), the TS Null packets accounting for 33.3% of the SPTS packets. If the Null packets are captured and stored, along with the PES, then that amount of storage capacity and additional bandwidth that is needed would be that much higher than necessary. This is especially true when the video is captured as CBR (e.g., captured and stored with both TS packets TS 0 through TS 13 and TS Null packets 126, 128, and 130) and then transmitted as VBR, and the TS Null packets are discarded first before delivery. Storing CBR and VBR versions of streams separately nearly doubles the storage requirement.

When video is captured and the MPEG-2 TS Nulls are removed for efficient storage, the MPEG-2 TS Nulls need to be recreated for CBR delivery. One solution requires packing the MPEG-TS packets into network packets, which is an expensive operation that uses the PCR in the MPEG-TS. This solution requires knowing the bit rate (i.e., CBR) of the stream and then having the ability to synthesize the TS Null packets at delivery for each stream. This costly operation directly impacts a systems ability to scale to many delivery streams, and the product cost associated with doing so.

SUMMARY OF THE INVENTION

The techniques described herein provide methods, apparatuses, and computer program products for efficiently storing transport streams. Such efficient storage of transport streams facilitates preprocessing the transport streams on ingest, which greatly reduces the complexity and processing required to regenerate the transport streams from the stored transport streams.

In one aspect, there is a method. The method is a computerized method for storing a first transport stream. The method includes receiving a first sequence of one or more packets associated with the first transport stream, the first sequence including one or more data packets. The method also includes generating a storage packet by selecting one or more packets from the first sequence, the storage packet including a packet header and the one or more data packets. The method also includes identifying one or more null packet insertion locations in a second sequence of one or more packets associated with a second transport stream. The method also includes generating null packet insertion information based on the one or more null packet insertion locations, the information including data indicative of a reconstruction parameter related to reconstructing the second sequence from the storage packet by inserting one or more null packets that are not stored in the storage packet, wherein the packet header includes the null packet insertion information. The method also includes storing the storage packet.

In one aspect there is a system. The system is a system for storing a transport stream. The system includes a data storage device. The system also includes a processor in communication with the data storage device. The processor is configured to receive a first sequence of one or more packets associated with the first transport stream, the first sequence including one or more data packets. The processor is also configured to generate a storage packet by selecting one or more packets from the first sequence, the storage packet including a packet header and the one or more data packets. The processor is also configured to identify one or more null packet insertion locations in a second sequence of one or more packets associated with a second transport stream. The processor is also configured to generate null packet insertion information based on the one or more null packet insertion locations, the information including data indicative of a reconstruction parameter related to reconstructing the second sequence from the storage packet by inserting one or more null packets that are not stored in the storage packet, wherein the packet header includes the null packet insertion information. The processor is also configured to store the storage packet in the data storage device.

In another aspect, there is a computer program product. The computer program product is tangibly embodied in a computer readable medium. The computer program product includes instructions being operable to cause a data processing apparatus to receive a first sequence of one or more packets associated with the first transport stream, the first sequence including one or more data packets. The instructions are also operable to cause a data processing apparatus to generate a storage packet by selecting one or more packets from the first sequence, the storage packet including a packet header and the one or more data packets. The instructions are also operable to cause a data processing apparatus to identify one or more null packet insertion locations in a second sequence of one or more packets associated with a second transport stream. The instructions are also operable to cause a data processing apparatus to generate null packet insertion information based on the one or more null packet insertion locations, the information including data indicative of a reconstruction parameter related to reconstructing the second sequence from the storage packet by inserting one or more null packets that are not stored in the storage packet, wherein the packet header includes the null packet insertion information. The instructions are also operable to cause a data processing apparatus to store the storage packet.

In another aspect there is a system. The system includes means for receiving a first sequence of one or more packets associated with the first transport stream, the first sequence including one or more data packets, generating a storage packet by selecting one or more packets from the first sequence, the storage packet including a packet header and the one or more data packets, identifying one or more null packet insertion locations in a second sequence of one or more packets associated with a second transport stream, and generating null packet insertion information based on the one or more null packet insertion locations, the information including data indicative of a reconstruction parameter related to reconstructing the second sequence from the storage packet by inserting one or more null packets that are not stored in the storage packet, wherein the packet header includes the null packet insertion information. The system also includes means for storing the storage packet.

In other examples, any of the aspects above can include one or more of the following features. The first sequence can be received as one or more transport packets. Identifying can include comparing a size of the first sequence to a predetermined size of a constant bit rate packet. The first sequence can further include one or more null packets in a packet order, and generating the storage packet can further include removing one or more of the one or more null packets from the selected packets. The first transport stream can be a constant bit rate transport stream, and the one or more null packet insertion locations can be based on the one or more removed null packets from the selected packets.

In some examples, the packet header is part of a storage packet header, and the data indicative of the reconstruction parameter includes the one or more null packet insertion locations in the second sequence based on the packet order. The second sequence can preserve a packet order of the first sequence, and the second transport stream preserves a sequence of the first transport stream. The packet header can be inserted at a location in the storage packet based on the packet order and the one or more null packet insertion locations, wherein the data indicative of the reconstruction parameter includes a number of removed null packets at the location.

In other examples, the packet header is inserted at an end of the storage packet, wherein the data indicative of the reconstruction parameter includes a number of the one or more null packets removed from the first sequence. The packet header can be part of a storage packet header, and the data indicative of the reconstruction parameter can include a number of the one or more null packets removed from the first sequence.

In some examples, the packet header is read, one or more null packets are determined to insert into the second sequence associated with the second transport stream based on the data indicative of the reconstruction parameter, the second sequence is reconstructed by inserting the one or more null packets into the second sequence, and the second sequence is transmitted. The data indicative of the reconstruction parameter can include the one or more null packet insertion locations based on a packet order, and reconstructing can include inserting the one or more null packets into the second sequence based on the one or more null packet insertion locations.

In other examples, the packet header is read from a location in the storage packet, wherein the data indicative of the reconstruction parameter includes a number of removed null packets at the location, and reconstructing includes inserting the number of removed null packets from the one or more null packets into the second sequence at the location. The packet header can be read from an end of the storage packet, the data indicative of the reconstruction parameter can include a number of the one or more null packets removed from the first sequence, and reconstructing can include inserting the number of the one or more null packets into the second sequence at the end of the second sequence.

In some examples, the data indicative of the reconstruction parameter includes a number of the one or more null packets removed from the first sequence, and reconstructing includes inserting the one or more null packets at an end of the second sequence. The first transport stream can be a constant bit rate stream or a variable bit rate stream, and the second transport stream can be a constant bit rate stream. A third sequence can be reconstructed from one or more packets associated with a third transport stream without inserting null packets, and the third sequence can be transmitted.

In other examples, the first transport stream is a constant bit rate stream or a variable bit rate stream, and the third transport stream is a variable bit rate stream. Storing can include storing the storage packet in one or more storage blocks. Storing can include storing a first packet header and a first portion of the storage packet in a first storage block and storing a second packet header and a second portion of the storage packet in a second storage block. Storing can include storing the storage packet in a persistent memory. The data storage device can include a hard drive, a flash memory system, a data buffer, a transient data buffer, a queueing system, a dynamic random access memory device, or any combination thereof.

The transport stream storage techniques described herein can provide one or more of the following advantages. Coded video is stored in an efficient (canonical) format that supports both CBR and VBR delivery from a single file, and the format maintains information regarding the TS Null packets so that at delivery the TS Null packets can be re-inserted into the packet. This is done by removing the TS Null packets from the stream when received, remembering the location and number of TS Null packets, and then representing this information in a more compact format. By doing so, the TS Null packets are compressed, resulting in more efficient storage and bandwidth utilization. When the SPTS is delivered as a CBR stream, the TS Nulls can be re-inserted to reconstitute the CBR stream and bit rate. When delivered as VBR no TS Nulls are added.

The use of Ingest processing to packetize non-Null and Null packets makes for efficient and scalable transmission of a video stream in either CBR or VBR format. The decision to transmit in CBR or VBR is made by the transmitter, and stored content can be transmitted concurrently in both CBR and VBR formats. By preprocessing the streams and reordering the MPEG-2 TS Null packets at Ingest, the complexity associated with inserting Nulls is significantly reduced, enabling significant delivery scaling.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Figure 1:
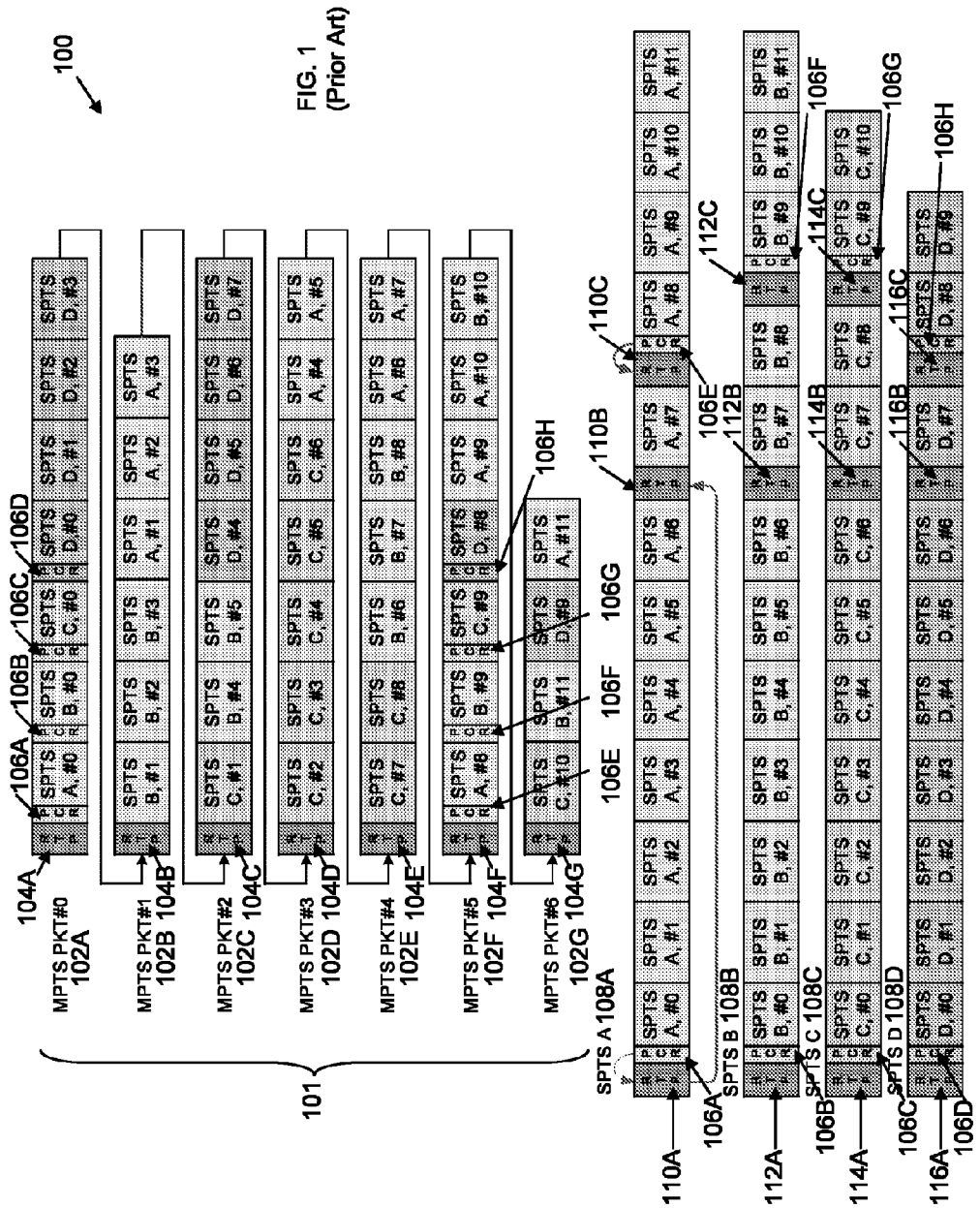
FIG. 1 is an exemplary diagram of the prior art illustrating multiple program transport stream packets carried using the real-time transport protocol.
Figure 2:
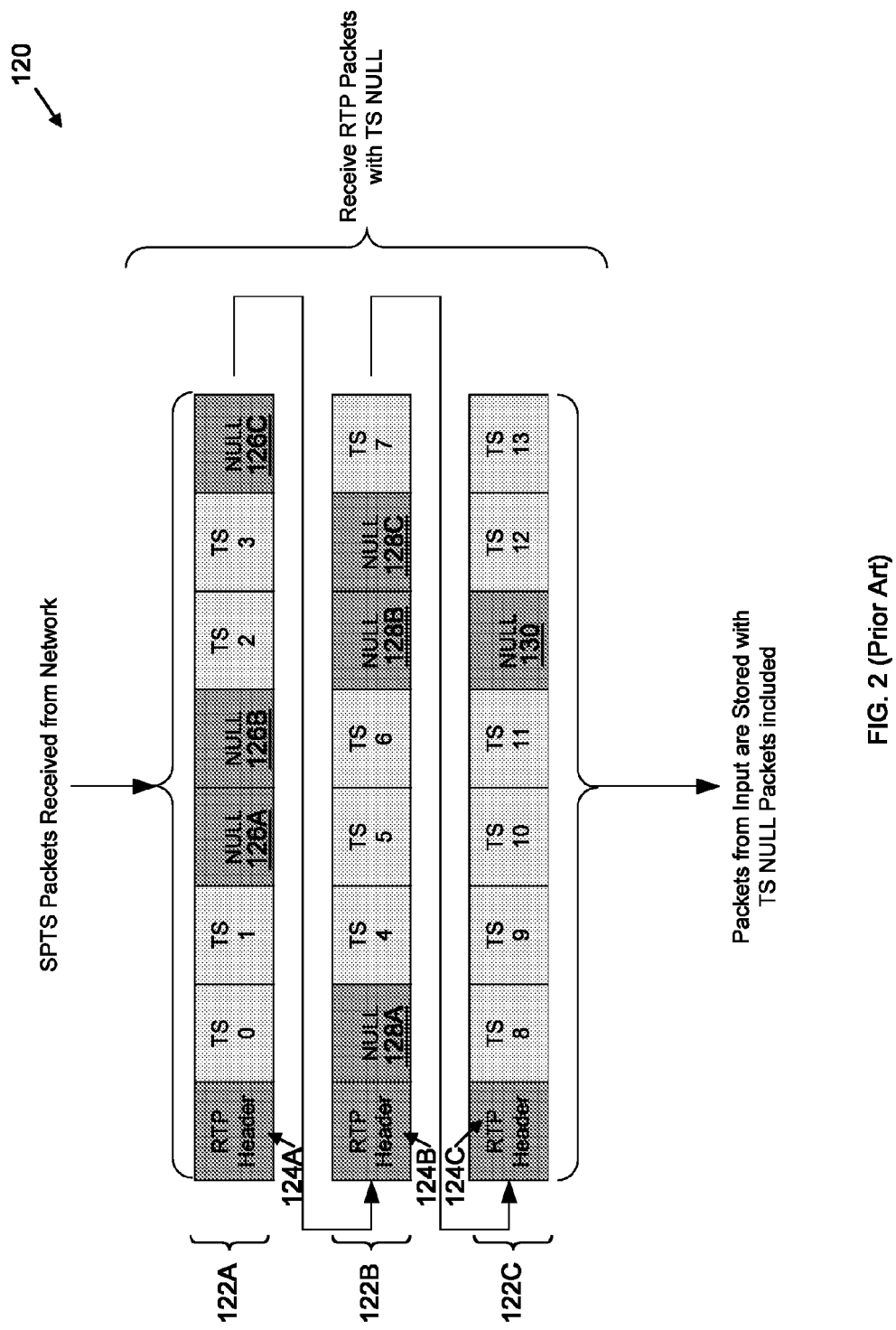
FIG. 2 is an exemplary diagram of the prior art illustrating real-time transport protocol packets for a single program transport steam, the real-time transport protocol packets including transport stream null packets.

Presently preferred embodiments are illustrated in the drawings. Although the figures refer primarily to ingesting CBR transport streams with one or more Null packets and delivering CBR transport streams with one or more Null packets, it should be understood that the subject matter described herein is applicable to ingesting either CBR or VBR transport streams with any number of Null packets and delivering either CBR or VBR transport streams with any number of Null packets based on an internally defined packet format. While the embodiments herein are described primarily in the context of RTP encapsulation, it should be understood that the subject mater described herein is applicable in network implementations using other network protocols for ingest and delivery including, without limitation, UDP (without RTP) and/or TCP. Moreover, a different protocol can be used for delivery than is used for ingest.

Figure 3:
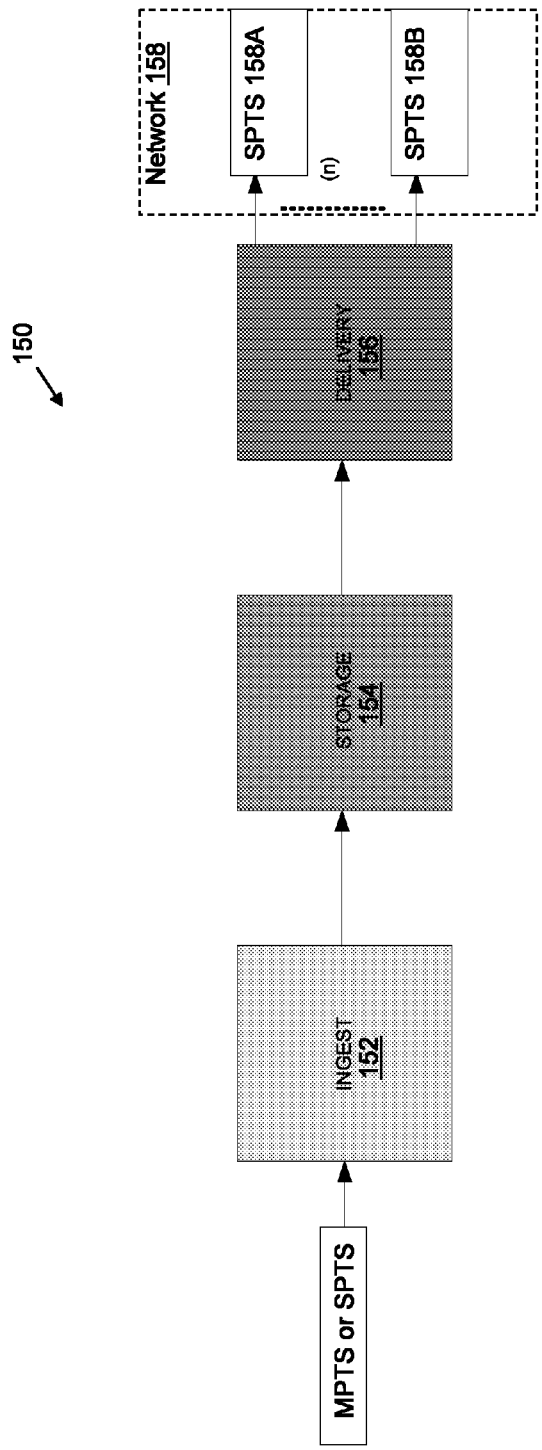
FIG. 3 is an exemplary diagram showing a system for efficiently storing transport streams.

FIG. 3 is an exemplary diagram showing a system 150 for efficiently storing transport streams. System 150 includes an ingest module 152, a storage module 154, a delivery module 156, and network 158. Network 158 can be used to support any number of transmissions SPTS 158A through SPTS 158B (or MPTS, etc.). The ingest module 152 receives Network packets (e.g., over Ethernet, such as over 10 Gb Ethernet (GbE)) containing MPTS and/or SPTS data (e.g., video). The ingest module 152 processes the video for storage in the storage module 154. The delivery module 156 reads the video from the storage module 154 and transmits the video to the network 158. A single ingested video stream may be read from the storage module 154 and replicated multiple times to serve subscribers by the delivery module 156. In order to perform this function at scale (e.g., transmit a single SPTS to 10,000 subscribers), it is advantageous to pre-condition the SPTS at ingest by the ingest module 152 for reduced delivery complexity. Pre-conditioning includes, for example, compressing any Null packets in the SPTS so that a single file can be delivered to subscribers in either CBR or VBR format.

With further respect to the ingest module 152, the ingest module 152 pre-conditions arriving video streams to facilitate high scale video delivery (e.g., to minimize complexity and maximize storage capacity and bandwidth). The ingest module can perform one or more pre-conditioning steps. For example, the ingest module 152 can convert VBR streams to CBR streams. The conversion can be performed by inserting one or more null packets (e.g., MPEG-2 TS Null packets) into the VBR stream to achieve a CBR stream. Alternatively, the VBR to CBR conversion can be performed by determining the insertion points of null packets into the VBR stream without actually inserting the null packets, as these null packets will only be removed in a subsequent phase of the ingest process as described later. The MPEG-2 TS PCR can be recomputed if the position in the stream changes with respect to the inserted Null position(s). The ingest module 152 can perform CBR null compression. For example, the ingest module 152 can reorder MPEG-2 TS Null packets as needed to simplify the delivery process, remove one or more nulls from the stream and record the number and/or position in an internal packet format, and re-compute the MPEG-2 TS PCR as needed if the position in the stream changes.

Figure 6A:
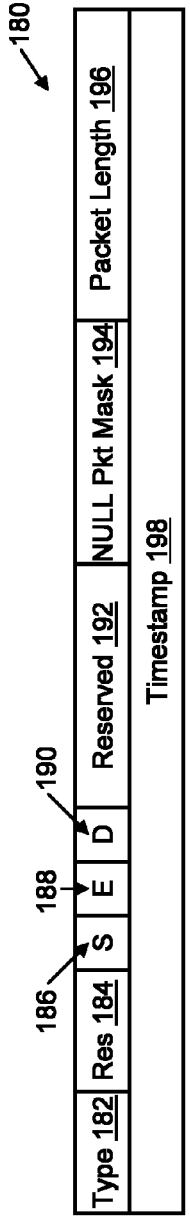
FIG. 6A is a diagram showing an internal packet header for an internal packet format according to a first embodiment.
Figure 9A:
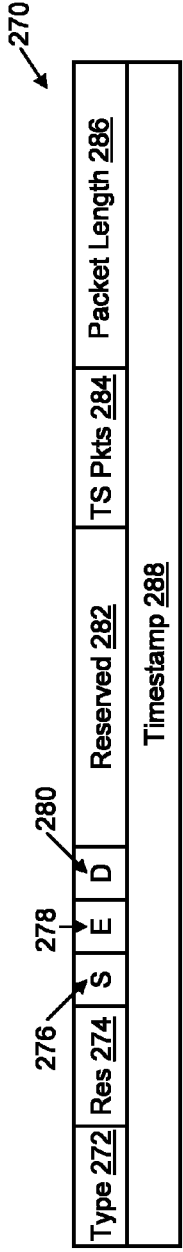
FIG. 9A is a diagram showing an internal packet header for an internal packet format according to a second embodiment.

The ingest module 152 can create the internal packet format (e.g., using the internal packet format defined by the internal packet header 180 of FIG. 6A or the internal packet header 270 of FIG. 9A). In the description herein, the term internal packet format is used to describe the internal packet format defined by an internal packet header. It should be understood that the terms "internal" and "storage" can be used interchangeably to refer to, for example, the packet format, elements within the packet format, and the packets created using the packet format, which are generated after the ingest stream and before the delivery stream. A storage packet is created by instantiating an internal packet header and using the internal packet header to encapsulate data, such as TS packets. The internal packet format can include, for example, up to seven MPEG-2 TS packets. The internal packet format can also indicate the number and/or position of MPEG-2 TS Null packet(s) that need to be re-inserted on delivery when using the internal packet format. The ingest module 152 can also perform storage segmentation. For example, the ingest module 152 can segment the packetized video stream into fixed size blocks for storage in the storage module 154, which are generally referred to as Storage Units (SU).

In addition to any pre-conditioning performed by the ingest module 152, the ingest module 152 may also mitigate delivery complexity (e.g., when performing Trick Modes and when switching content at video frame boundaries, such as using a playlist to perform Ad Insertion). For example, the ingest module 152 can be configured to perform PCR interval compliance conditioning for splicing and trick modes (e.g., for PCR at the Start of a File, PCR at play-list boundaries (e.g., In and Out—Random Access Points), and PCR at the beginning and end of Index frames). The ingest module 152 can be configured to perform continuous PCR conditioning. For example, the ingest module 152 aligns the PCR, PTS, and/or DTS in TS cells for reduced delivery complexity by positioning timestamps in the TS for easy re-stamping in the data path, and creating flags to indicate the location of the PCR, PTS, and/or DTS in the internal packet format. Or, for example, the ingest module can strip any PCR discontinuity as needed. The ingest module 152 can be configured to remap the PID, PAT, and/or PMT to default values for easy remapping at delivery. The ingest module 152 can, for example, insert PAT and/or PMT to meet an interval requirement (e.g. a 100 ms interval requirement) as needed. Once PCR insertion and/or PTS and DTS adjustments are made (if any), the stream can be segmented into packets and sent to the storage module 154.

While FIG. 3 shows the ingest module 152, the storage module 154, and the delivery module 156 as separate modules, and in some embodiments the functionality of one or more of the modules can be combined into one module (e.g., executed by a processor in communication with a storage device). The storage module 154 can include and/or be in communication with a data storage device (see e.g., FIGS. 7, 10, 13, and 16). The data storage device can be, for example, a persistent memory storage, a hard drive, a flash memory system, a data buffer, a transient data buffer, a queueing system, a dynamic random access memory (DRAM) device, and/or other types of storage systems and devices.

Figure 4:
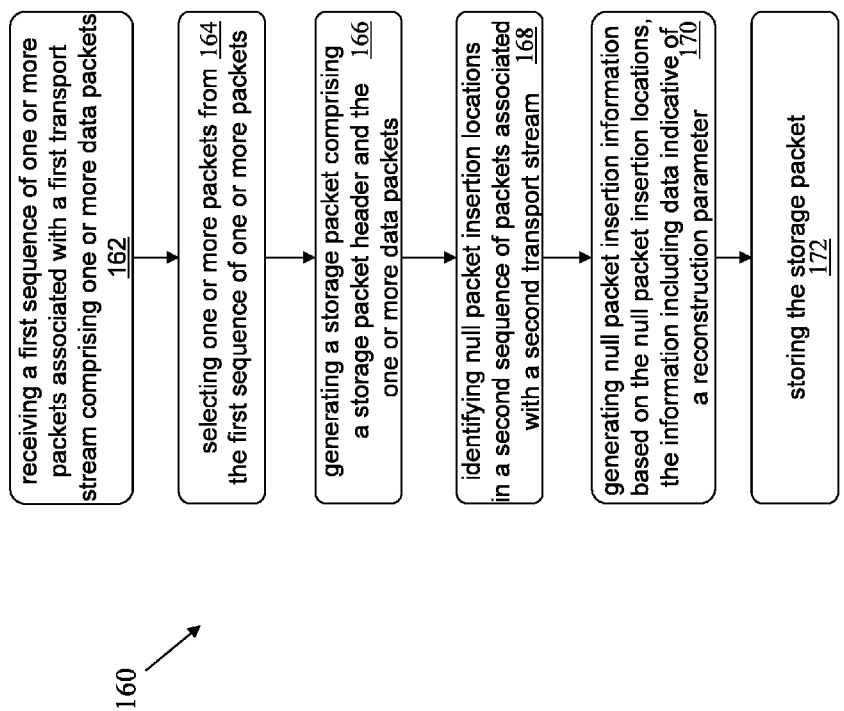
FIG. 4 is a flow chart illustrating a method for efficiently storing a transport stream.

FIG. 4 is a flow chart illustrating a computerized method 160 for efficiently storing a transport stream. The ingest module 152 receives (162) a first sequence of one or more packets associated with a first transport stream. The first sequence includes one or more data packets. The ingest module 152 selects (164) one or more packets from the first sequence of one or more packets. The ingest module 152 generates (166) a storage packet that includes a packet header and the one or more selected data packets. The ingest module 152 identifies (168) one or more null packet insertion locations in a second sequence of one or more packets associated with a second transport stream. The ingest module 152 generates (170) null packet insertion information based on the one or more null packet insertion locations, the information including data indicative of a reconstruction parameter. The reconstruction parameter is related to reconstructing the second sequence from the storage packet by inserting one or more null packets that are not stored in the storage packet. The packet header includes the null packet insertion information. The storage packet is stored (172) in the storage module 154. The steps of method 160 are explained in further detail with respect to FIGS. 6B, 9B, 12, and 15.

With further respect to step 162, the first sequence of one or more packets can be packets within a network packet (e.g., network packet 202 of FIG. 6B, network packet 302 of FIG. 9B, network packet 402 of FIG. 12, or network packet 502 of FIG. 15) associated with a first transport stream (e.g., a SPTS or a MPTS). The first transport stream can be received in one network packet or a plurality of network packets depending on the size (e.g., the number of TS packets) of the first transport stream. If the first sequence is a VBR stream, the first sequence may not include any TS Null packets in the first sequence. If the first sequence is a CBR stream, the first sequence may include one or more TS Null packets among the first sequence (e.g., NULL 206A and NULL 206B of network packet 202 of FIG. 6B, NULL 306A and NULL 306B of network packet 302 of FIG. 9B, NULL 406A and NULL 406B of network packet 402 of FIG. 12, or NULL 506A and NULL 506B of network packet 502 of FIG. 15).

Figure 6B:
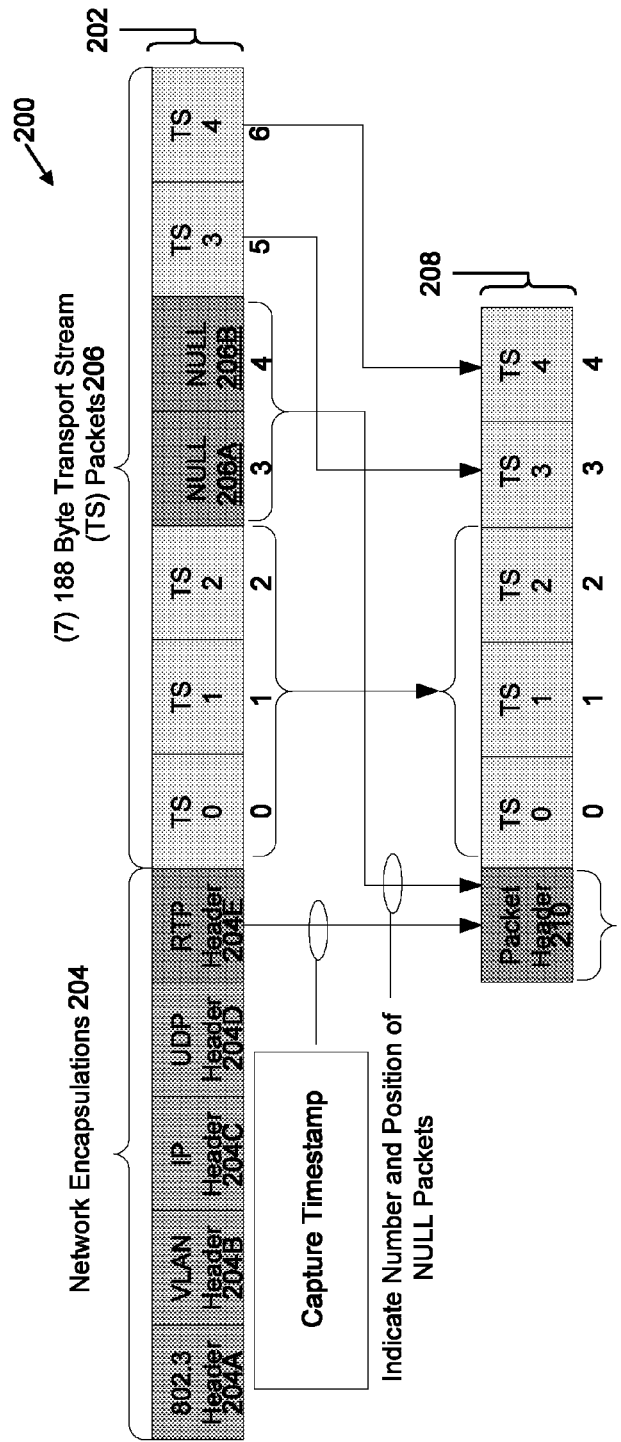
FIG. 6B is a diagram showing the use of the internal packet header of FIG. 6A for storing a network packet according to a first embodiment.

With further respect to step 164 and 166, if the first sequence includes one or more TS Null packets, the ingest module 152 can, for example, select the TS packets of the first sequence that are not TS Null packets (e.g., TS 0 through TS 4 of network packet 202 of FIG. 6B). The ingest module 152 can generate a storage packet including a packet header and the selected TS packets that are not TS Null packets (e.g., internal packet header 210, which delineates internal packet 208 of FIG. 6B).

Figure 5:
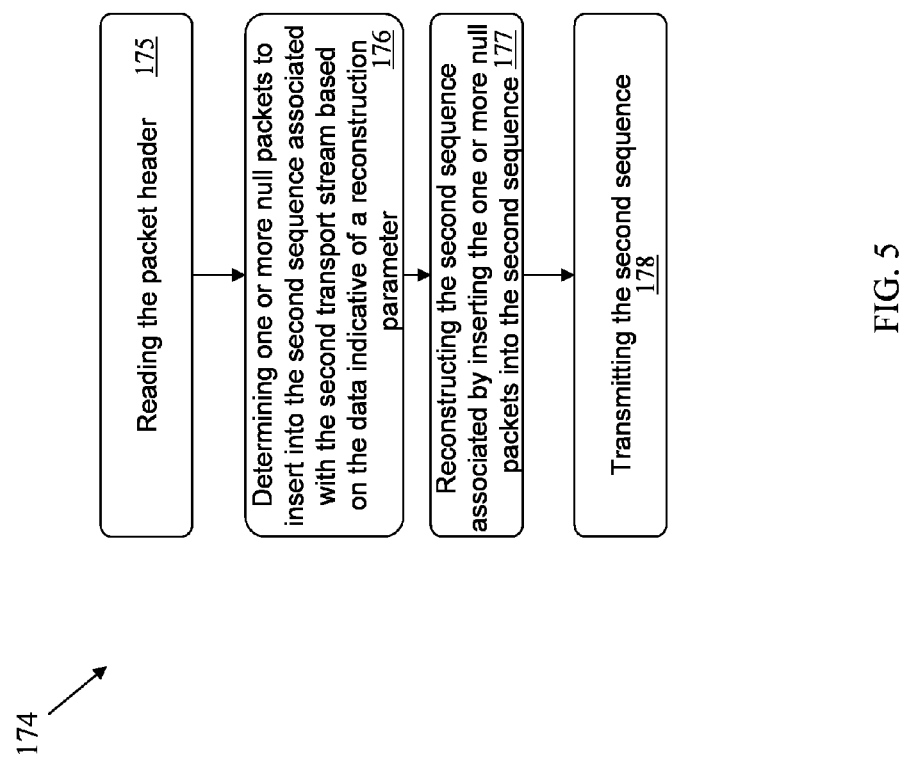
FIG. 5 is a flow chart illustrating a method for reconstructing an efficiently stored transport stream.
Figure 14:
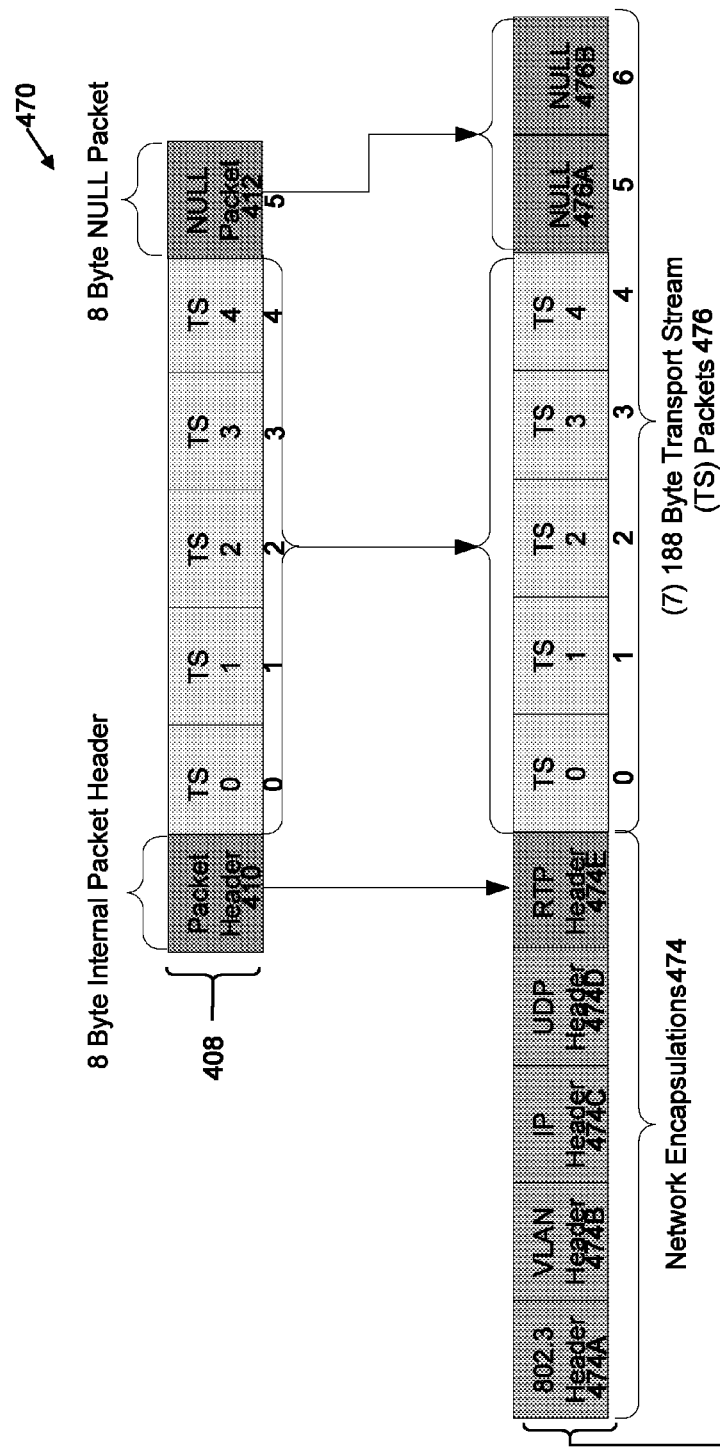
FIG. 14 is a diagram illustrating the reconstruction of the internal packet of FIG. 12 for delivery according to a third embodiment.

With further respect to step 168, the second transport stream can be a SPTS or MPTS stream reconstructed and transmitted by the delivery module 156 (see method 174 of FIG. 5). The delivery module 156 can transmit the second transport stream as a CBR or VBR stream. For example, the delivery module 156 transmits the second transport stream via one or more network packets, each of the one or more network packets including a sequence of one or more packets (e.g., TS packets). In some examples, the second sequence of one or more packets is identical to the first sequence of one or more packets (e.g., reconstructed network packet 252 of FIG. 8 includes the same sequence of packets as network packet 202 of FIG. 6B, namely three TS packets TS 0 through TS 2 in locations zero through three, two Null packets in locations three and four, and two TS packets TS 3 and TS 4 in locations five and six, respectively). In some examples, the second sequence of one or more packets is not identical to the first sequence of one or more packets (e.g., the TS packets 476 of reconstructed network packet 472 of FIG. 14 are not identical to the TS packets 406 of network packet 402 of FIG. 12). Advantageously, the delivery module 156 can simultaneously deliver multiple transport streams (i.e., second transport steams), either VBR or CBR, from the same storage packet(s).

With further respect to step 170, the null packet insertion information (e.g., the NULL Pkt Mask 194 of internal packet header 180 of FIG. 6A or TS Pkts 284 of internal packet header 270 of FIG. 9A) includes data indicative of a reconstruction parameter for reconstructing the second sequence of one or more packets from the storage packet. For example, the null packet insertion information can include data indicative of reconstructing a CBR network packet from the storage packet by inserting a predetermined number of TS Null packets into the reconstructed network packet. The packet header can be a storage packet header (e.g., internal packet header 210 of storage packet 208 of FIG. 6B) and/or a packet header that is located within the storage packet (e.g., Null packet 312 of storage packet 308 of FIG. 9B).

FIG. 5 is a flow chart illustrating a method 174 for reconstructing an efficiently stored transport stream (e.g., the stream stored by the storage packet of computerized method 160). The delivery module 156 reads (175) the packet header from a storage packet in the storage module 154. The delivery module 156 determines (176) one or more null packets to insert into the second sequence associated with the second transport stream based on the data indicative of the reconstruction parameter. The delivery module 156 reconstructs (177) the second sequence by inserting the one or more null packets into the second sequence. The delivery module transmits (178) the second sequence (e.g., over network 158). The steps of method 174 are explained in further detail with respect to FIGS. 8, 11, 14, and 17.

FIG. 6A is a diagram showing an internal packet header 180 for an internal packet format according to a first embodiment. The internal packet header 180 includes a type field 182, a Res (i.e., reserved) field 184, a Start of Packet (S) field 186, an End of Packet (E) field 188, and a Discontinuity (D) field 190. The internal packet header 180 includes a reserved field 192, a NULL Pkt Mask field 194, a packet length field 196, and a timestamp 198. The Res field 184 is a 2-bit reserved field. The reserved field 192 is a 7-bit reserved field.

The internal packet format (e.g., defined by internal packet header 180) allows for the creation of variable length packets, indicated by the S field 186 (i.e., the start), the E field 188 (i.e., the end), and the packet length field 196, as well as up to seven MPEG-2 TS Null Packets. The internal packet format consists of the fixed size internal packet header 180 (e.g., 8-bytes), and generally a payload, although a payload is not required in all instances. The type field 182 in the header describes the contents of the packet. The type field 182 is a 2-bit field, and indicates the type of packet defined by the corresponding internal packet header. Some examples of values for the type field 182 include 2'b00=padding, 2'b01=command, 2'b10=data, and 2'b11=reserved. For example, if the ingest module 152 needs to define a data packet to store one or more TS packets, the ingest module sets the type field 182 to '2'b10 to indicate the packet is a data packet. The system 150 can use the type field 182 to appropriately process packets for the internal packet format.

The Start and End of Packet Flags (e.g., S field 186 and E field 188) delineate delivery packet boundaries for repacketization. The S field 186 is used to indicate whether the data contained in the internal packet defined by the internal packet header is at the start of a delivery packet (e.g., 1'b0=not the start of the delivery packet, while 1'b1=the start of the delivery packet). The E field 188 is used to indicate whether the data contained in the internal packet defined by the internal packet header is data from the end of the delivery packet (e.g., 1'b0=not the end of the delivery packet, while 1'b1=the end of the delivery packet). The S field 186 and E field 188 can be used when a delivery packet is stored across multiple SU's (see e.g., FIGS. 7, 10, 13, and 16).

The discontinuity flag (i.e., the D field 190) indicates whether a change in content has occurred (e.g., 1'b0=not discontinued, 1'b1=discontinued). The packet length field 196 is an 11-bit field and is set to the number of payload bytes until the next internal packet header (ranging between 0 and 2047). The packet length is the indicator of the distance to the next internal packet header in an array of bytes. A zero length in the packet length field 196, for example, indicates that there is no payload, only the header. The timestamp field 198 is set to the timestamp of the network packet (e.g., the timestamp for an RTP packet).

The NULL Pkt Mask field 194 conveys information regarding any MPEG-2 TS Null packets (e.g., the position and number of TS Null Packets) that have been removed by the ingest module 152 and need to be reinserted by the delivery module 156 if the MPEG-2 TS is to be delivered as CBR. For example, if the NULL Pkt Mask field 194 is set to 7'b1010010, the internal packet represented by the network packet includes three Null packets at packet locations zero, two, and five. For a network packet that can contain up to seven packets, the NULL Pkt Mask field 194 is a 7-bit field. The size (i.e., number of bits) of the NULL Pkt Mask field 194 can be adjusted based on the number of packets that can be contained within each network packet.

FIG. 6B is a diagram 200 showing the use of the internal packet header of FIG. 6A for storing a network packet 202 according to a first embodiment. Network packet 202 includes network encapsulations 204, including 802.3 Header 204A, virtual local area network (VLAN) header 204B, IP header 204C, user datagram protocol (UDP) header 204D, and RTP header 204E. While network packet 202 includes the specific network encapsulations 204 shown, those skilled in the art can appreciate that the network encapsulations can vary based on the dynamics of the system (e.g., transmission control protocol (TCP) instead of UDP, etc.). Network packet 202 includes a sequence of one or more packets associated with a transport stream (not shown). Network packet 202 includes seven TS packets 206, including TS 0, TS 1, TS 2, Null 206A, Null 206B, TS 3, and TS 4. While network packet 202 includes the seven TS packets 206, this is for illustration purposes only and network packet 202 can include any number of packets, including zero packets. Internal packet 208 includes an 8-byte internal packet header 210 (e.g., the internal packet header of FIG. 6A), and TS packets TS 0 through TS 4.

Referencing method 160 of FIG. 4, network packet 202 is received (162) by the ingest module 152 and its network encapsulation 204 is removed (e.g., Layer-2, IP, TCP, etc.). The stream is de-multiplexed as necessary (MPTS to SPTS), and then encapsulated using the internal packet format into the internal packet 208. The ingest module 152, using the internal packet format, pre-packages the video for easy delivery by generating (164, 166) storage packet 208 including up to seven MPEG-2 TS packets. Packet header 210 is the overall storage packet header for storage packet 208.

With further respect to steps 168 and 170, any Null packets (e.g., Null packets 206A and 206B) present in network packet 202 are removed and their position recorded in packet header 210. The ingest module 152 identifies (168) the locations of the removed null packets and generates data indicative of a reconstruction parameter which comprises one or more null packet insertion locations in a delivery sequence (e.g., the locations of where to insert the removed null packets in the delivery sequence generated by the delivery module 156) based on the packet order of the received network packet 202.

For example, TS Null packets 206A and 206B are removed and are not inserted into the internal packet 208 defined by the internal packet header 210. The NULL Pkt Mask 194 is used to indicate the number and position of TS Null packets removed from the network packet. The ingest module 152 sets the NULL Pkt Mask 194 to 7'b0001100, indicating that two TS Null packets were removed from the network packet (i.e., the two "1"s in the NULL Pkt Mask 194), and are located at TS packet locations three and four (of locations zero through six, seven locations total). The packet header 210 also contains any information that is necessary to deliver the packet once read from the storage module 154, such as timestamps (e.g., the RTP Header 204E timestamp), etc.

Figure 7:
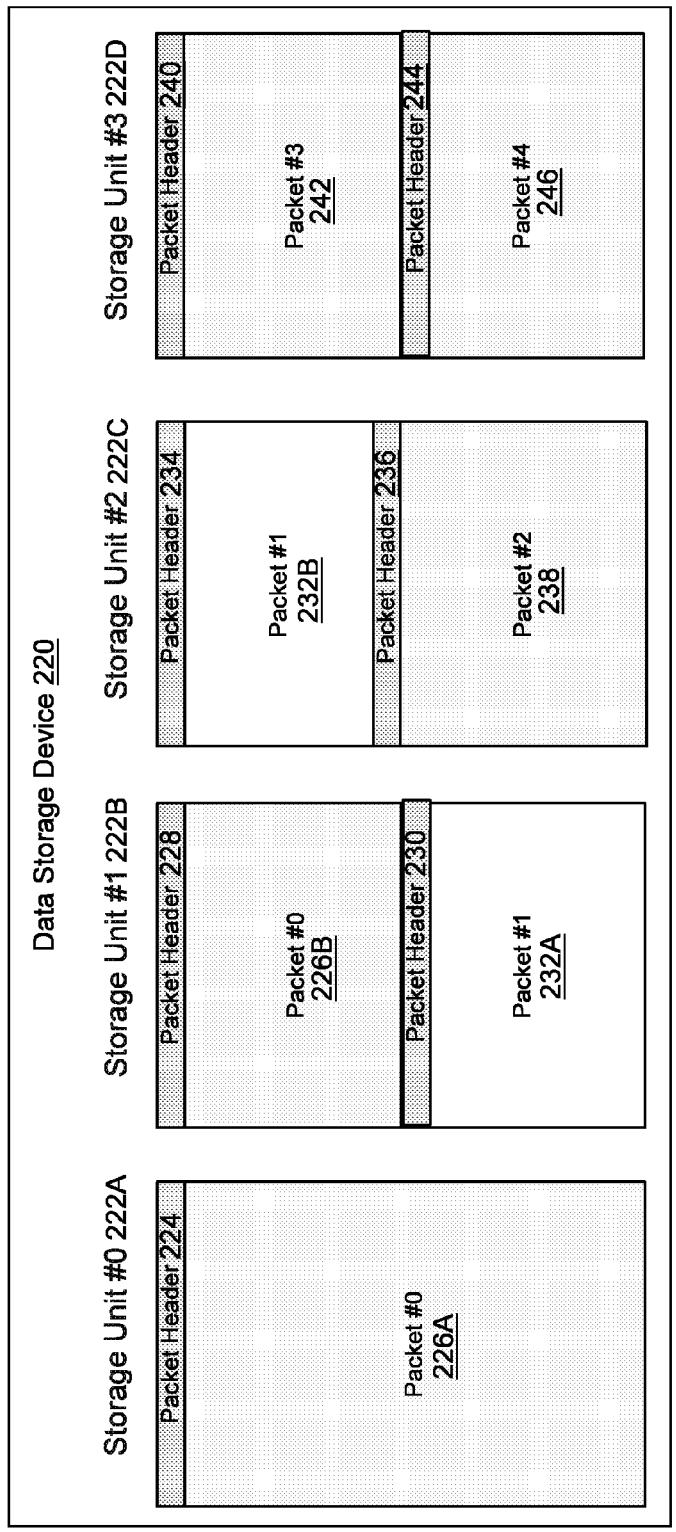
FIG. 7 is a diagram illustrating the storage of the internal packets in a data storage device according to a first embodiment.

FIG. 7 is a diagram illustrating the storage of the internal packets in data storage device 220 according to a first embodiment. Data storage device 220 includes storage unit #0 222A, storage unit #1 222B, storage unit #2 222C, and storage unit #3 222D, collectively data storage units 222. While FIG. 7 includes four data storage units 222, the data storage device 220 can include any number of storage units. Storage Unit #0 222A includes packet header 224 (e.g., an internal packet header 180 of FIG. 6A) and a first portion of packet #0 226A. Storage unit #1 222B includes packet header 228, a second portion of packet #0 226B, packet header 230, and a first portion of packet #1 232A. Storage unit #2 222C includes packet header 234, a second portion of packet #1 232B, packet header 236, and packet #2 238. Storage Unit #3 222D includes packet header 240, packet #3 242, packet header 244, and packet #4 246.

Each storage block or storage unit (SU) 222 is fixed size (e.g., 512-bytes) and may contain one or more packets for delivery (e.g., via delivery module 156). A storage packet for delivery may also span multiple storage units (e.g., packet #0 226 spans storage unit #0 222A and storage unit #1 222B, and packet #1 232 spans storage unit #1 222B and storage unit #2 222C). For a storage packet that spans multiple storage units, the successive portions each include a packet header to identify the information. For example, packet #0 226B includes packet header 228 to identify the contents of packet #0 226B within storage unit 1 222B. Specifically, with reference to the internal packet header 180 of FIG. 6A, packet header 224 will have its S field 186 set to 1'b1 to indicate packet header 224 is the start of packet #0 226. The E field 188 of packet header 224 is set to 1'b0 to indicate the data delineated by packet header 224 (e.g., the first portion of packet #0 226A) is not the end of the packet, since the end of the packet is contained in storage unit #1 222B. Packet header 228, conversely to packet header 224, will have its S field 186 set to 1'b0 to indicate packet header 228 is not the start of packet #0 226A, and will have its E field 188 set to 1'b1 to indicate the second portion of packet #0 226B is the end of packet #0 226. Other storage packets for delivery may be contained entirely within one storage unit (e.g., packets #2 238, #3 242, and #4 246). For example, packet header 236 will have its S field 186 set to 1'b1 and its E field 188 set to 1'b1 to indicate packet header 236 is both the start and end of packet #2 238.

Figure 8:
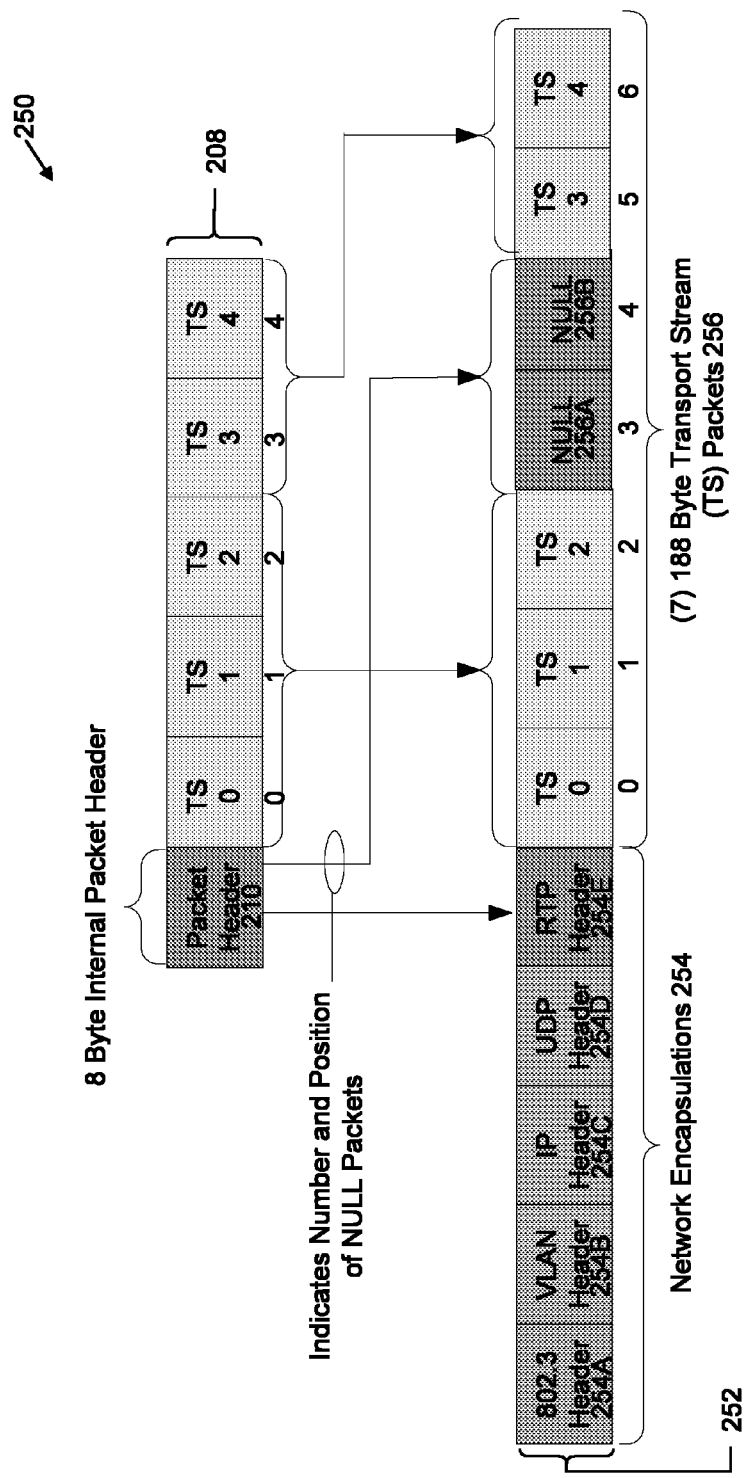
FIG. 8 is a diagram illustrating the reconstruction of the internal packet of FIG. 6B for delivery according to a first embodiment.

FIG. 8 is a diagram 250 illustrating the reconstruction of the internal packet 208 of FIG. 6B for delivery according to a first embodiment. Reconstructed network packet 252 includes network encapsulations 254. Network encapsulations 254 include an 802.3 header 254A, a VLAN header 254B, an IP header 254C, a UDP header 254D, and an RTP header 254E. The reconstructed network packet 252 includes a second sequence of seven TS packets 256, including TS 0, TS 1, TS 2, Null 256A, Null 256B, TS 3, and TS 4.

Referencing method 174 of FIG. 5, the delivery module 156 reads (175) the packet header 210 from storage packet 208 in the storage module 154. The delivery module 156 determines (176) that two null packets need to be inserted into the delivery sequence of reconstructed network packet 252 (which is associated with a delivery transport stream) based on the data indicative of the reconstruction parameter of packet header 210 (i.e., the NULL Pkt Mask 194). The data indicative of the reconstruction parameter includes the one or more null packet insertion locations based on the packet order of network packet 202. For example, the delivery module 156 reads the packet header 210 and determines two Null packets (e.g., Null 256A and Null 256B) need to be inserted into the reconstructed network packet 252 at locations three and four (of locations zero through six, where TS 0 is at location zero, TS 1 is at location one, etc.). The delivery module 156 reconstructs (177) the delivery sequence of TS packets 256 by inserting the one or more null packets into the sequence. The delivery module transmits (178) the delivery sequence (e.g., over network 158).

The delivery module reads the storage units (e.g., storage unit #0 222A through storage unit #3 222D) from the storage module 154 (e.g., from a data storage), re-inserts all TS Null packets (e.g., MPEG-2 TS Null packets) indicated by the internal packet format header, and creates the network framing (e.g., adding the network encapsulations 254) before transmitting the packet. In this embodiment, the NULL Ptr Mask 194 in the internal packet header 180 contains the reconstruction data. Advantageously, the exact number and position of the TS Null packets at delivery by the delivery module 156 is preserved as received by the ingest module 152 in the video stream (e.g., CBR to CBR conversion). If the received stream was a VBR stream, the TS Null packets can be computed and inserted into the stream by VBR to CBR conversion.

Advantageously, the method can use space in the packet header to store the 7-bit mask (NULL Pkt Mask 194), and the data path inserts 188-byte MPEG-2 TS packets anywhere into the stream as indicated by the mask. By creating and storing network packet data in internal packets defined by the internal packet header 180 at ingest (e.g., via ingest module 152), the delivery process is simplified. Data that is to be put into network packets and sent by the delivery module 156 may contain one or more internal packet format headers. The internal packet format allows for placing packet headers at the beginning of each storage unit (see e.g., FIGS. 7, 10, 13, and 16), for error recovery robustness, as well as anywhere in a packet. This allows for control information and commands to be placed in-line with the data, as well as padding to align the packet data for simpler Delivery.

FIG. 9A is a diagram showing an internal packet header 270 for an internal packet format according to a second embodiment. The internal packet header 270 includes a type field 272, a Res (i.e., reserved) field 274, a Start of Packet (S) field 276, an End of Packet (E) field 278, and a Discontinuity (D) field 280. The internal packet header 270 includes a reserved field 282, a TS Pkts field 284, a packet length field 286, and a timestamp 288. The TS Pkts field 284 indicates the number of Null packets that should be inserted at the location of the internal packet header 270 within the storage packet. For example, the internal packet format includes a NULL type, and when the type field 272 is set to NULL, the TS Pkts field 284 is checked by the delivery module 156 to determine the number of Null packets to insert into the reconstructed network packet. The TS Pkts field 284 is a 3-bit field, with a value range of zero to seven. The packet length field 286 indicates the distance to the next internal packet header within the storage packet.

Figure 9B:
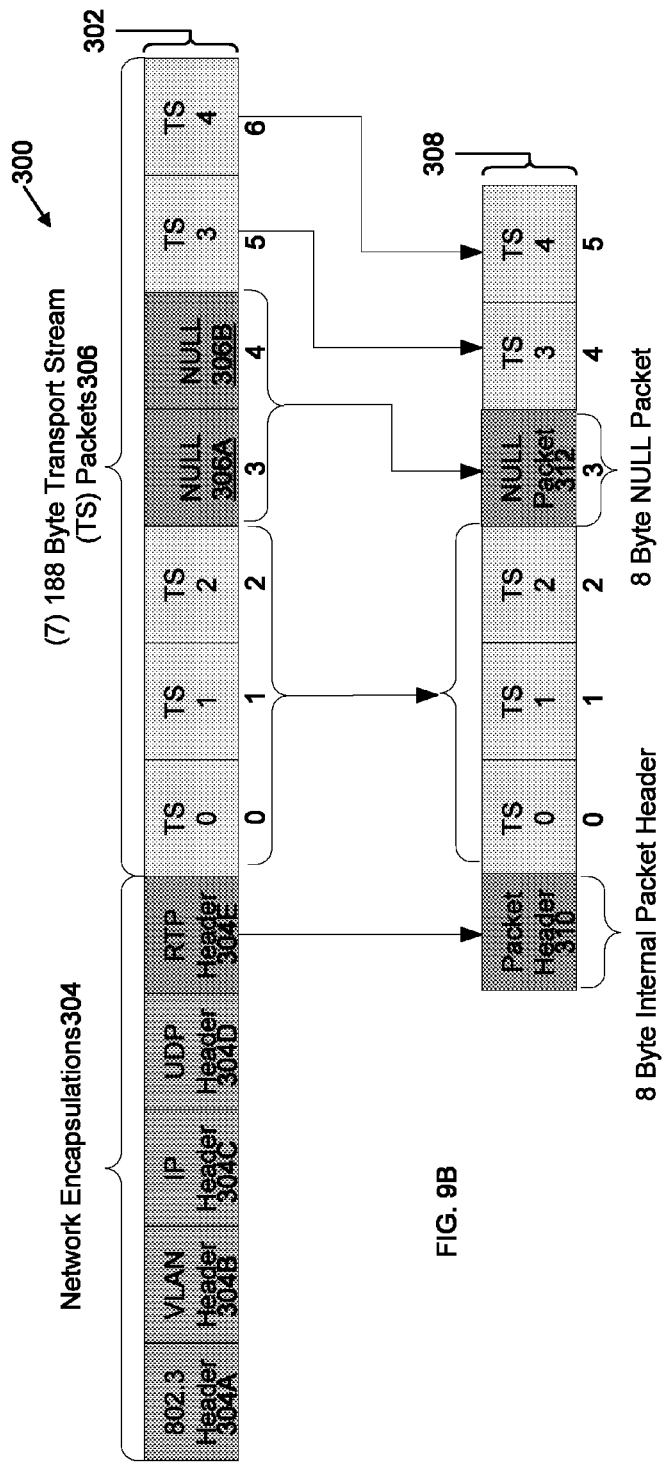
FIG. 9B is a diagram showing the use of the internal packet header of FIG. 9A for storing a network packet according to a second embodiment.

FIG. 9B is a diagram 300 showing the use of internal packet header 270 of FIG. 9A for storing network packet 302 according to a second embodiment. Network packet 302 includes network encapsulations 304, including 802.3 Header 304A, virtual local area network (VLAN) header 304B, IP header 304C, user datagram protocol (UDP) header 304D, and RTP header 304E. Network packet 302 includes a sequence of one or more packets associated with a transport stream (not shown). Network packet 302 includes seven TS packets 306, including TS 0, TS 1, TS 2, Null 306A, Null 306B, TS 3, and TS 4. Internal packet 308 includes an 8-byte internal packet header 310 (e.g., the internal packet header of FIG. 6A), TS packets TS 0 through TS 4, and an Null packet header 312 (e.g., an instance of internal packet header 270). Packet header 310 can be an internal packet header 180. For example, the type field 182 is set to indicate that packet header 310 is the internal packet header and does not include information regarding null packets (e.g., depending on the value the type field 182 is set to, the NULL Pkt Mask 194 may or may not be valid).

Referencing method 160 of FIG. 4, the Null packet header 312 is inserted (e.g., by the ingest module 152) at a location in the storage packet 308 based on the packet order of network packet 302 (e.g., TS 0 is before TS 1, etc.) and the one or more null packet insertion locations (e.g., Null 306A and 306B were removed from locations three and four, respectively). With respect to step 170, the data indicative of the reconstruction parameter comprises a number of removed null packets at the insertion location. For example, Null packet header 312 is inserted at location three, and the TS Pkts field 284 of Null packet header 312 is set to 3'b010 to indicate two packets need to be inserted at location three upon reconstruction of the storage packet 308.

In general, TS Null packets are removed and replaced with a more compact marker, the internal packet header 270, which is only 8-bytes long. If each TS packet 306 is 188-bytes, the storage packet 308 replaces 376-bytes with one 8-byte internal packet header 270. The internal packet header 270 indicates the position and the number of MPEG-2 TS packets being replaced at the insertion location. As few as zero and as many as seven TS Null packets can be replaced with the internal packet header 270. The internal packet header 270 can exist in the middle of a data packet (e.g., storage packet 308), aligned to MPEG-2 TS packet boundaries, at the beginning and/or end of the storage packet 308, and/or the like.

While diagram 300 only shows two consecutive Null packets 306A and 306B, the internal packet header 270 can be inserted into the video stream whenever one or more (MPEG-2) TS Null packets are present. For example, if the TS 0 packet at location zero was a TS Null packet, TS 0 would be replaced with an internal packet header 270 at location zero of storage packet 308, and the TS Pkts field 284 would be set to indicate only one TS Null packet is to be inserted at location zero during reconstruction of the storage packet 308. Because the TS Pkts field 284 is three bits, one in-line Null packet can represent up to seven TS Null packets. The internal packet header 270 also indicates the packet length in the packet length field 286, indicating the remaining portion of the network packet stored in the storage packet 308. If the length of the packet length field 286 is zero, then no more data exists and the internal packet header 270 is the last TS packet in the storage packet. If the length of the packet length field 286 is non-zero, the packet length field 286 indicates the distance to the next internal packet header 270. This can require, for example, keeping the TS Pkt field 284 state from any previous internal packet headers inserted in place of TS null packets in order to know how many TS packets are in the network packet.

Figure 10:
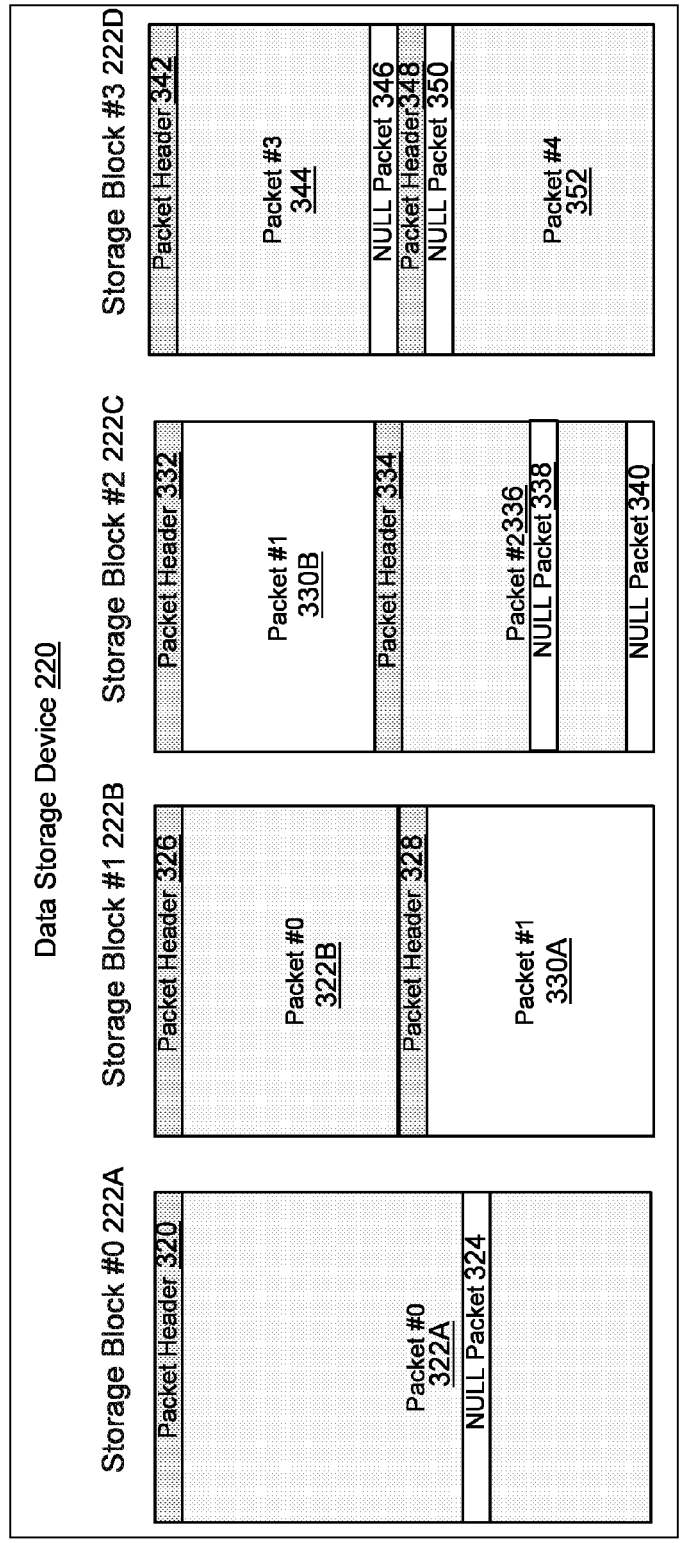
FIG. 10 is a diagram illustrating the storage of the internal packets in a data storage device according to a second embodiment.

FIG. 10 is a diagram illustrating the storage of the internal packets in data storage device 220 of FIG. 7 according to a second embodiment. Storage Block #0 222A includes packet header 320 (e.g., packet header 310 of FIG. 9B) for the first portion of packet #0 322A, which includes Null packet 324 (e.g., Null packet header 312). Storage Block #1 222B includes packet header 326 for the second portion of packet #0 322B. Storage Block #1 222B also includes packet header 328 for the first portion of packet #1 330A. Storage block #2 222C includes packet header 332 for the second portion of packet #1 330B, and packet header 334 for packet #2 336, which includes Null packet 338 and Null packet 340. Storage block #3 222D includes packet header 342 for packet #3 344, which includes Null packet 346 at the end of packet #3 344. Storage block #3 222D also includes packet header 348 for packet #4 352, which includes Null packet 350 at the beginning of packet #4 352.

Figure 11:
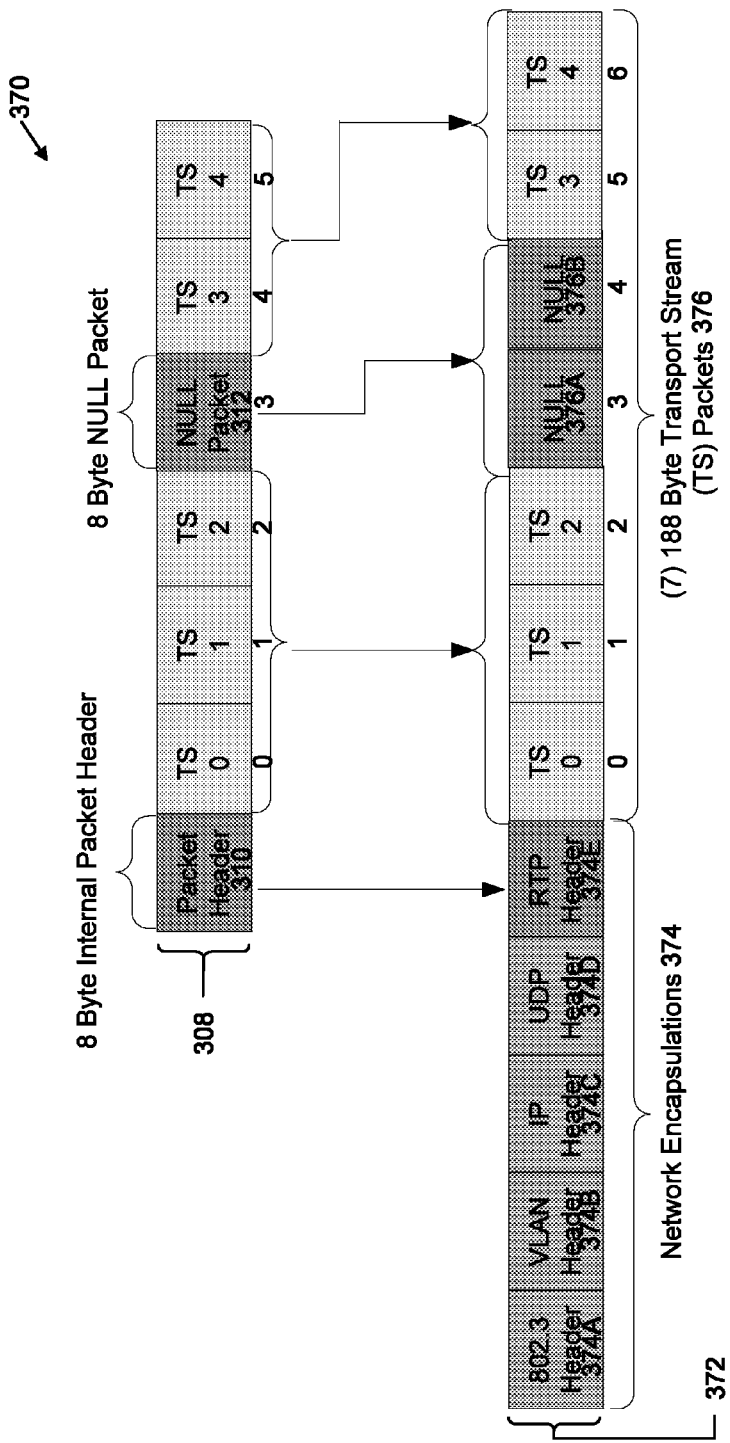
FIG. 11 is a diagram illustrating the reconstruction of the internal packet of FIG. 9B for delivery according to a second embodiment.

FIG. 11 is a diagram illustrating the reconstruction of an internal storage packet 308 of FIG. 9B for delivery according to a second embodiment. Reconstructed network packet 372 includes network encapsulations 374. Network encapsulations 374 include an 802.3 header 374A, a VLAN header 374B, an IP header 374C, a UDP header 374D, and an RTP header 374E. The reconstructed network packet 374 includes a second sequence of seven TS packets 376, including TS 0, TS 1, TS 2, Null 376A, Null 376B, TS 3, and TS 4.

Referencing method 174 of FIG. 5, with further respect to step 175, each packet header is read from a location in the storage packet from the data storage device 220. For example, packet header 320 is read from storage block #0 222A, and the delivery module 156 parses the header information to determine to read the first portion of packet #0, 322A. The delivery module 156 reads Null packet 324 (e.g., an instance of internal packet header 270) from a location in the first portion of storage packet #0 322A. For example, with reference to the storage packet 308, the delivery module 156 reads Null packet 312 from location three.

With further respect to step 176, for each Null packet header read, the packet header includes data indicative of a reconstruction parameter that comprises a number of removed null packets at the location the storage packet is read from. For example, with reference to Null packet 312 of storage packet 308, the Null packet includes the TS Pkts field 284 which indicates that there were two null packets (e.g., Null 306A and Null 306B) removed from the location of Null packet 312.

With further respect to step 177, reconstructing comprises inserting the number of removed null packets (e.g., from a group of one or more null packets for insertion into the reconstructed network packet) into the reconstructed sequence at the location of the internal Null packet. For example, the delivery module 156 inserts Null 376A and Null 376B at locations three and four to reconstruct the sequence of reconstructed network packet 372. Advantageously, since on delivery the in-line null packets (e.g., Null packet 312) are converted to TS Null Packets before the packet is transmitted to the network, the exact number and position of the received TS Null packets are preserved in the reconstructed sequence.

Figure 12:
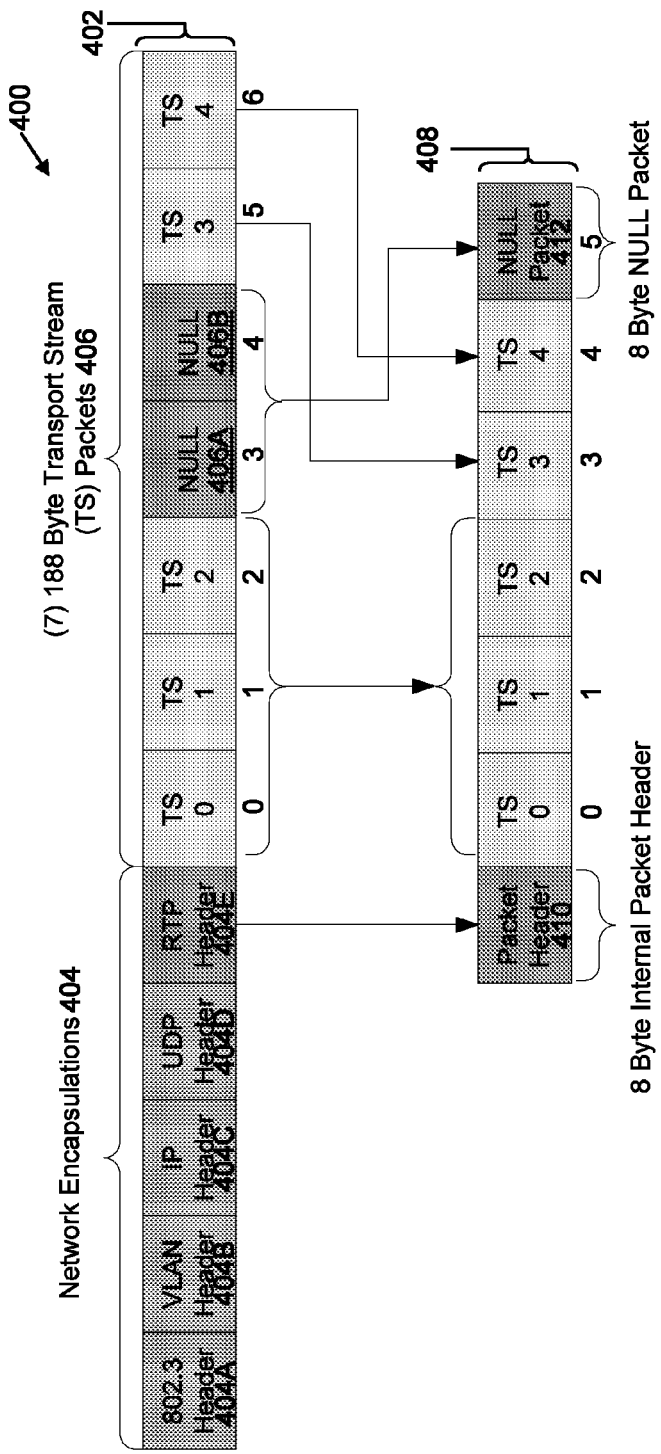
FIG. 12 is a diagram showing the use of the internal packet header of FIG. 9A for storing a network packet according to a third embodiment.

FIG. 12 is a diagram 400 showing the use of internal packet header 270 of FIG. 9A for storing network packet 402 according to a third embodiment. Network packet 402 includes network encapsulations 404, including 802.3 Header 404A, virtual local area network (VLAN) header 404B, IP header 404C, user datagram protocol (UDP) header 404D, and RTP header 404E. Network packet 402 includes seven TS packets 406, including TS 0, TS 1, TS 2, Null 406A, Null 406B, TS 3, and TS 4. Internal packet 408 includes an 8-byte internal packet header 410, TS packets TS 0 through TS 4, and a Null packet header 412 (e.g., an instance of internal packet header 270 of FIG. 9A). Packet header 410 can be an internal packet header 180. For example, the type field 182 is set to indicate that packet header 410 is the internal packet header and does not include information regarding null packets (e.g., depending on the value the type field 182 is set to, the NULL Pkt Mask 194 may or may not be valid).

Referencing method 160 of FIG. 4, with further respect to step 166, the packet header (e.g., Null packet 412) is inserted at the end of the storage packet 408. The packet header includes data indicative of a reconstruction parameter, which includes a number of the one or more null packets removed from the first sequence (e.g., the network packet 402). For example, null packet 412 is inserted at the end of internal packet 412 at location five. Null packet 412 is an instance of internal packet header 270, and the TS Pkts 284 field is set to 3'b010 to indicate two Null packets were removed from network packet 402.

Advantageously, this embodiment avoids the complexity of inserting 8-bit Null packets in the middle of storage packets (see e.g., FIGS. 9B-11). This can reduce the delivery complexity and requires no additional storage since no byte shifting is needed in the middle of a packet.

Figure 13:
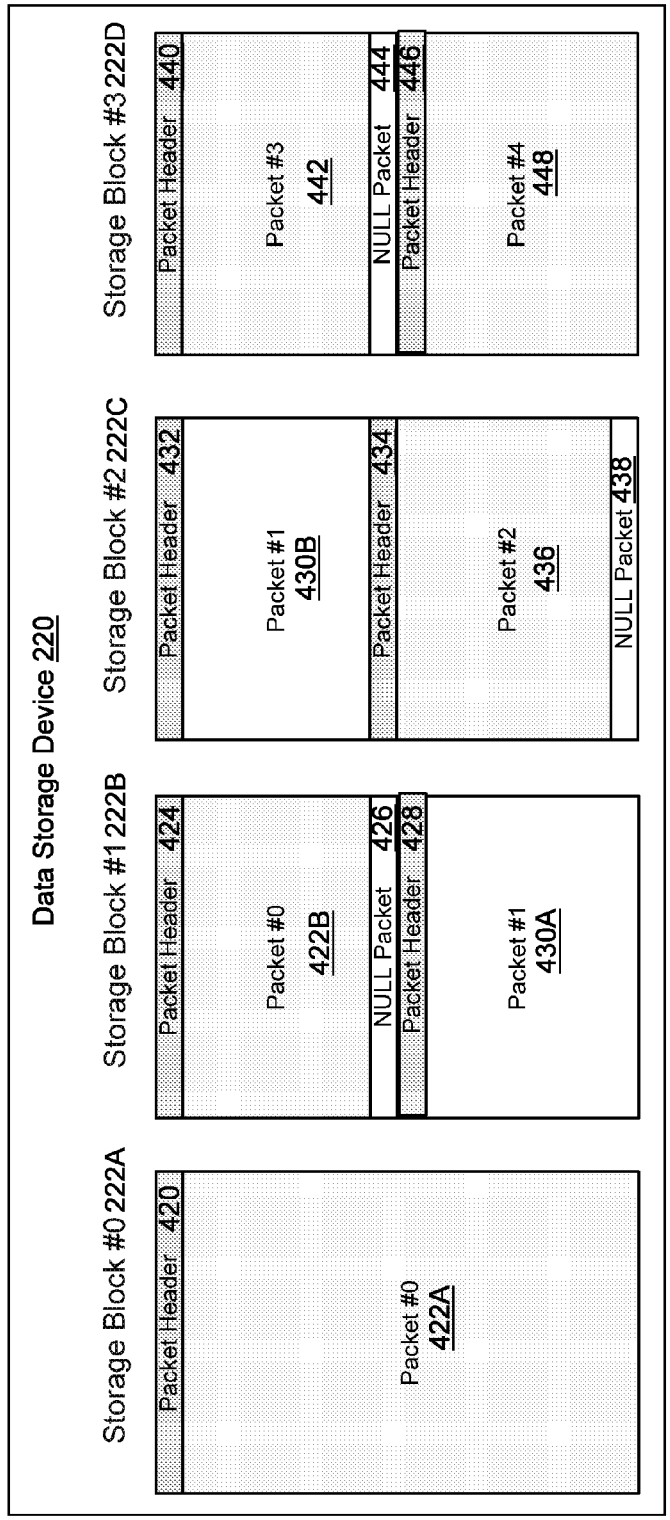
FIG. 13 is a diagram illustrating the storage of the internal packets in a data storage device according to a third embodiment.

FIG. 13 is a diagram illustrating the storage of the internal packets in the data storage device of FIG. 7 according to a third embodiment. Storage Block #0 222A includes packet header 420 (e.g., packet header 410 of FIG. 12) for the first portion of packet #0 422A. Storage Block #1 222B includes packet header 424 for the second portion of packet #0 422B, which includes Null packet 426 (e.g., null packet 412 of FIG. 12). Storage Block #1 222B also includes packet header 428 for the first portion of packet #1 430A. Storage block #2 222C includes packet header 432 for the second portion of packet #1 430B, and packet header 434 for packet #2 436, which includes Null packet 438. Storage block #3 222D includes packet header 440 for packet #3 442, which includes Null packet 444 at the end of packet #3 442. Storage block #3 222D also includes packet header 446 for packet #4 448.

FIG. 14 is a diagram 470 illustrating the reconstruction of internal storage packet 408 of FIG. 12 for delivery according to a second embodiment. Reconstructed network packet 472 includes network encapsulations 474. Network encapsulations 474 include an 802.3 header 474A, a VLAN header 474B, an IP header 474C, a UDP header 474D, and an RTP header 474E. The reconstructed network packet 472 includes a second sequence of seven TS packets 476, including TS 0, TS 1, TS 2, TS 3, TS 4, Null 476A, and Null 476B.

Referencing method 174 of FIG. 5, with further respect to step 175, the packet header at the end of the storage packet is read from the end of the storage packet. For example, the delivery module 156 reads Null packet 412 of storage packet 408 from the data storage device 220.

With further respect to step 176, the data indicative of the reconstruction parameter comprises a number of null packets removed from the first sequence. For example, the delivery module 156 reads the TS Pkts field 284 from the Null packet 412 to determine that two Null packets (e.g., Null packets 406A and 406B) were removed from network packet 402 when the ingest module 152 created storage packet 408. For example, with reference to FIG. 13, delivery module 156 reads packet header 420 from storage block #0 222A, determines the header 420 encapsulates data representative of the first portion of packet #0 422A, and reads out the first portion of packet #0 422A. The delivery module 156 reads packet header 424, determines the header 424 encapsulates data representative of the second portion of packet #0 422B, and reads out the second portion of packet #0 422B. While reading out the second portion of packet #0 422B, the delivery module 156 reads Null packet 426 and determines based on the data contained within the header how many Null packets to insert in the reconstructed network packet 172.

With further respect to step 177, reconstructing comprises inserting the number of null packets indicated in the Null packet at the end of the storage packet into the reconstructed delivery sequence at the end of the delivery sequence. For example, the delivery module 156 inserts Null packets 476A and 476B at the end of the reconstructed network packet 472.

The exact number of received TS Null packets is preserved, except re-ordered and put at the end of the reconstructed network packet during output. For example, network packet 402 included seven TS packets, two of which were Null packets 406A and 406B at locations three and four, respectively. Reconstructed network packet 472 also includes seven TS packets, but the Null packets 476A an 476B are located at the last two positions five and six, respectively. This can reduce delivery complexity. Appending Null packets can be a much simpler task (and thus computationally less expensive) than inserting TS packets into the middle of a network packet.

This process of re-packing the received transport stream may require the PCR value to change if its position in the stream changes. Since this process can be performed when the stream is received, the stream can be delivered at scale with minimal complexity. In some embodiments, adjusting the PCR value can be avoided (e.g., for the cases when a PCR is present in a packet containing TS Nulls) by leaving any Nulls in the packet that precede the PCR. Advantageously, the relative position of PCR and TS packets remains unchanged. This additional storage can be acceptable because it may not be often when Null packets precede the PCR value.

Figure 15:
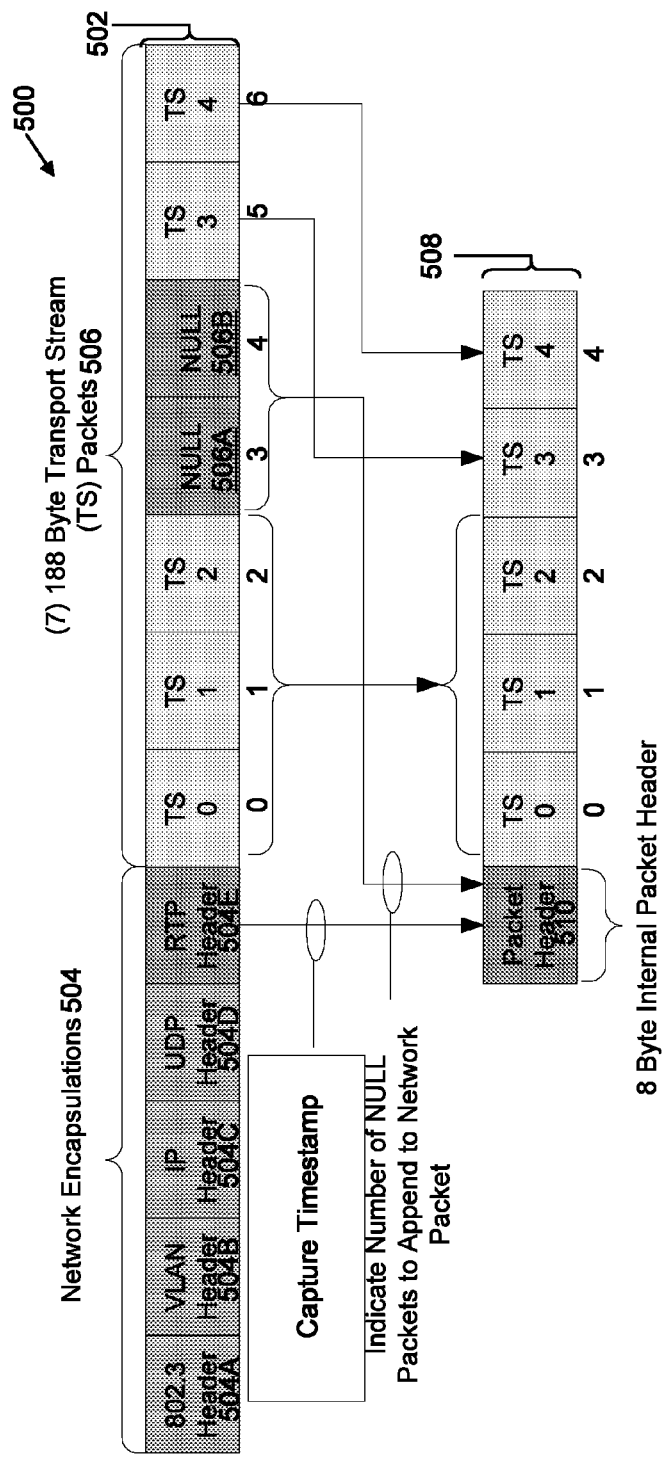
FIG. 15 is a diagram showing the use of the internal packet header of FIG. 9A for storing a network packet according to a fourth embodiment.

FIG. 15 is a diagram 500 showing the use of internal packet header 270 of FIG. 9A for storing network packet 502 according to a fourth embodiment. Network packet 502 includes network encapsulations 504, including 802.3 Header 504A, virtual local area network (VLAN) header 504B, IP header 504C, user datagram protocol (UDP) header 504D, and RTP header 504E. Network packet 502 includes seven TS packets 506, including TS 0, TS 1, TS 2, Null 506A, Null 506B, TS 3, and TS 4. Internal packet 508 includes an 8-byte internal packet header 510 and TS packets TS 0 through TS 4. Packet header 510 can be an instance of internal packet header 270 of FIG. 9A. For example, the TS Pkts field 284 is set to indicate the total number of TS packets within the network packet. As explained with reference to FIG. 17, the Null packets are appended to the end of the sequence of TS packets for the regenerated network packet.

Referencing method 160 of FIG. 4, with further respect to step 166, the packet header is the storage packet header 510. In some examples, to avoid having separate internal null packet formats (e.g., the format defined by internal packet header 180 of FIG. 6A or internal packet header 270 of FIG. 9A), while still reducing delivery complexity (e.g., by appending MPEG-2 TS Null packets to the end of the regenerated network packet instead of in-line during regeneration), the number of TS Nulls can be encoded in the internal storage packet header using the TS Pkts field 284 along with the length of the packet in the packet length field 286.

With further respect to step 170, the data indicative of the reconstruction parameter comprises the total number of packets and the packet length, from which the number of the one or more null packets removed from the first sequence can be derived (e.g., based on the number the TS Pkts field 284 is set to, and the length indicated by the packet length field 286). For example, if each TS packet is assumed to be 188 bytes, the network packet (e.g., network packet 502) will contain a multiple of 188-byte TS packets. The number of Nulls can be deduced from the difference between the packet length in the packet length field 286, divided by 188, and the number of TS Pkts indicated in the TS Pkts field 284. For example, the packet length field 286 is set to 940 bytes (188 bytes per TS packet×5 TS packets, TS 0 through TS 5), and the TS Pkts field 284 is set to equal seven, indicating that two TS Null packets need to be appended to the storage packet 508.

In some embodiments, the internal packet format (e.g., defined by internal packet header 270 of FIG. 9A) includes a field that indicates the number of TS Null packets to append to the network packet during regeneration. The packet length field 286 can indicate the exact length of the internal packet. For example, a field (e.g., the TS Pkts field 284) can indicate that two null packets, Null 506A and Null 506B, were removed from network packet 502 when creating internal packet 508. The packet length field 286 is set to 940 bytes (188 bytes per TS packet×5 TS packets, TS 0 through TS 5). During reconstruction (e.g., via delivery module 156), the field is read, indicating that two Null packets are to be inserted into the resulting network stream. As such, the use of the TS Pkts field 284 can indicate the total number of TS packets in the original network packet or the total number of TS Null packets removed from the original network packet.

Figure 16:
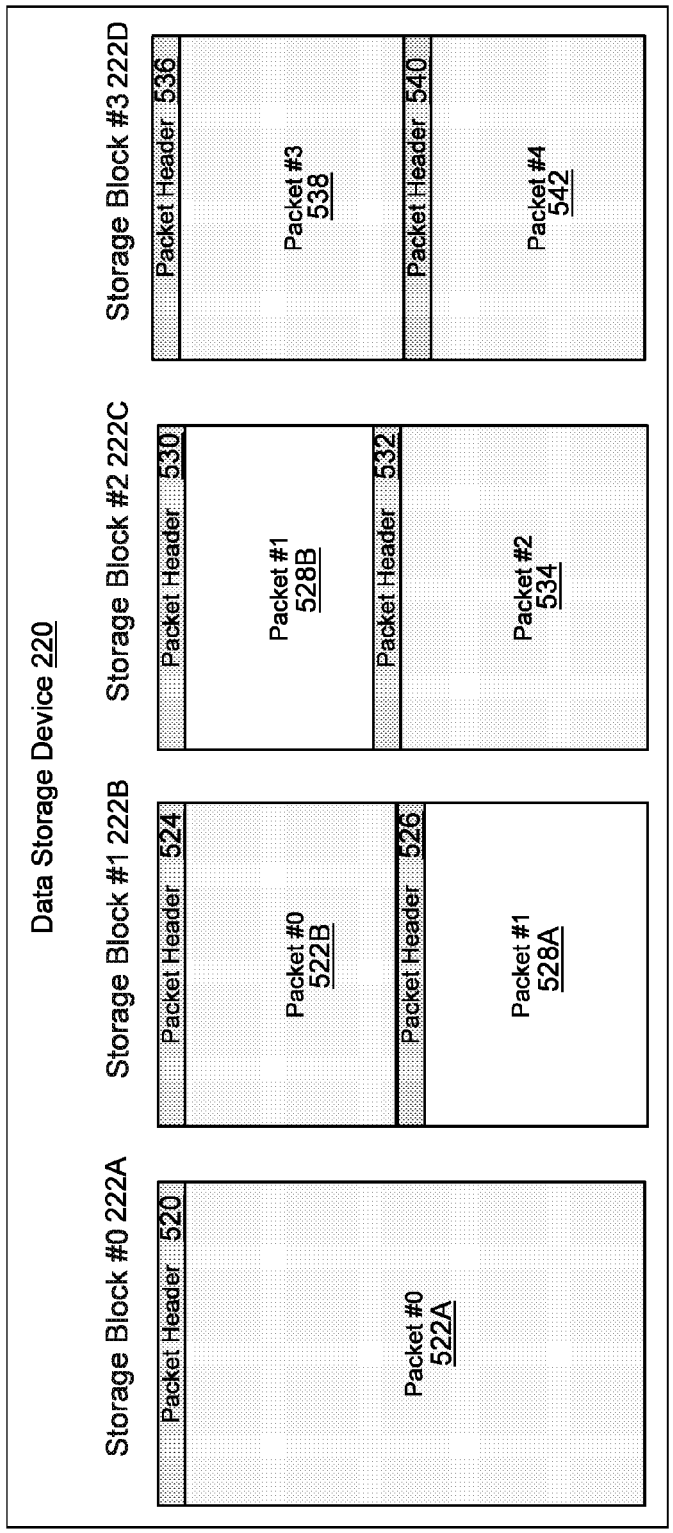
FIG. 16 is a diagram illustrating the storage of the internal packets in a data storage device according to a fourth embodiment.

FIG. 16 is a diagram illustrating the storage of the internal packets in the data storage device of FIG. 7 according to a fourth embodiment. Storage Block #0 222A includes packet header 520 (e.g., packet header 510 of FIG. 15) for the first portion of packet #0 522A. Storage Block #1 222B includes packet header 524 for the second portion of packet #0 522B. Storage Block #1 222B also includes packet header 526 for the first portion of packet #1 528A. Storage block #2 222C includes packet header 530 for the second portion of packet #1 528B, and packet header 532 for packet #2 534. Storage block #3 222D includes packet header 536 for packet #3 538. Storage block #3 222D also includes packet header 540 for packet #4 542.

Figure 17:
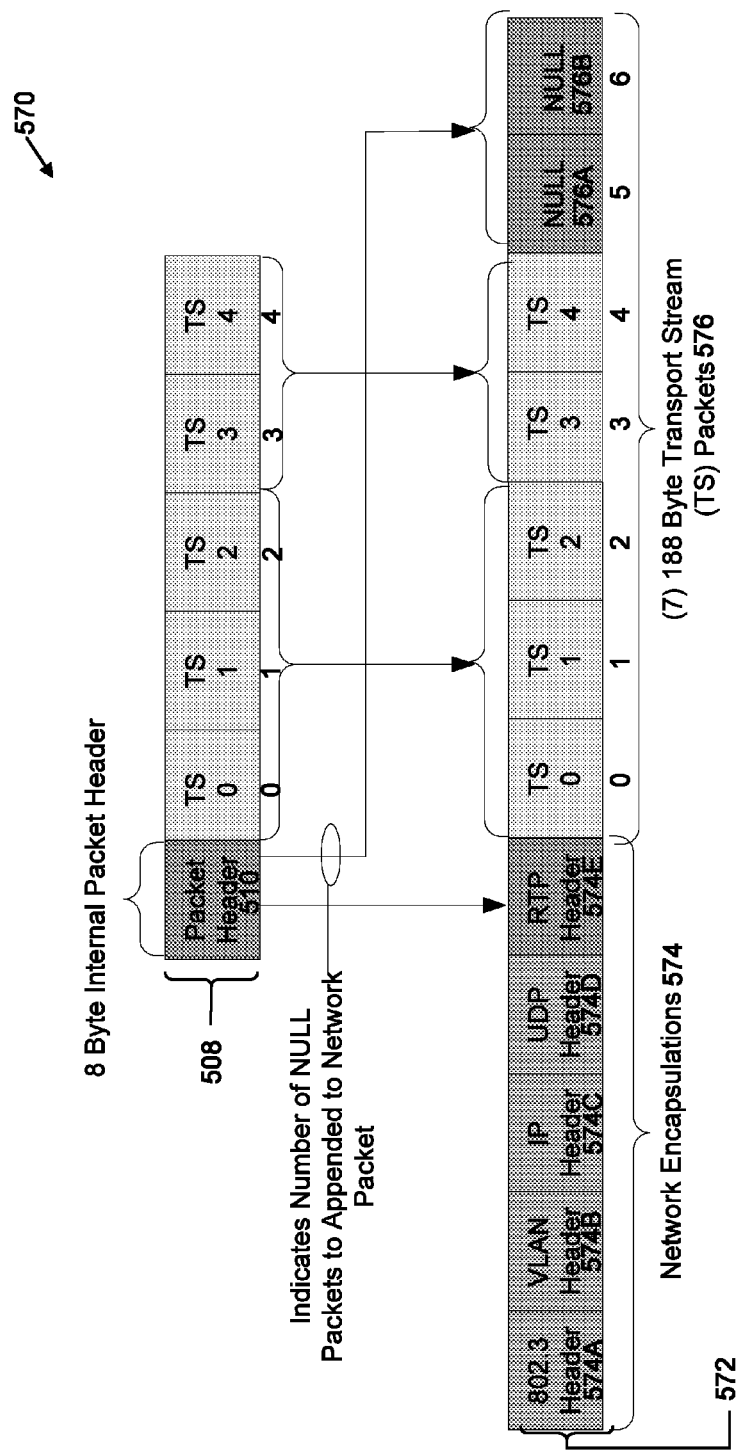
FIG. 17 is a diagram illustrating the reconstruction of the internal packet of FIG. 15 for delivery according to a fourth embodiment.

FIG. 17 is a diagram 570 illustrating the reconstruction of internal storage packet 508 of FIG. 15 for delivery according to a fourth embodiment. Reconstructed network packet 572 includes network encapsulations 574. Network encapsulations 574 include an 802.3 header 574A, a VLAN header 574B, an IP header 574C, a UDP header 574D, and an RTP header 574E. The reconstructed network packet 572 includes a second sequence of seven TS packets 576, including TS 0, TS 1, TS 2, TS 3, TS 4, Null 576A, and Null 576B.

Referencing method 174 of FIG. 5, with further respect to step 176, the data indicative of the reconstruction parameter comprises a number of the one or more null packets removed from the first sequence. As described above, the number of Nulls can be deduced from the difference between (1) the packet length in the packet length field 286, divided by 188, and (2) the number of TS Pkts indicated in the TS Pkts field 284. The number of Nulls can also be determined from a field (e.g., the TS Pkts field 284) that indicates the number of TS Null packets to append to the network packet during regeneration.

With further respect to step 177, reconstructing comprises inserting the one or more null packets at an end of the second sequence. Based on the number of Nulls to insert determined by step 176, that number of Null packets are inserted at the end of the delivery sequence of TS packets. For example, the delivery module 156 reads packet header 510 from storage (e.g., data storage device 220 of FIG. 16). The delivery module 156 determines two Null packets are to be inserted into the regenerated network packet based on one or more fields of the packet header 510. The delivery module 156 inserts Null 576A and Null 576B into regenerated network packet 572 at locations five and six, respectively. The first five locations include the TS packets, TS 0 through TS 4, delineated by packet header 510.

Advantageously, this embodiment has very low delivery complexity and uses only a small amount of state to convey how many MPEG-2 TS Null packets need to be re-inserted into the Network packet, since they are always appended to the sequence of TS packets.

In some examples, the network packet received by the ingest module 152 is a CBR stream (e.g., network packet 202 of FIG. 6B, network packet 302 of FIG. 9B, network packet 402 of FIG. 12, or network packet 502 of FIG. 15) comprising one or more TS null packets in the packet order of the network packet. The ingest module 152 removes one or more of the one or more TS null packets when generating the storage packet (e.g., storage packet 208 of FIG. 6B, storage packet 308 of FIG. 9B, storage packet 408 of FIG. 12, or storage packet 508 of FIG. 15).

In some examples, the network packet received by the ingest module 152 is a VBR stream that does not comprise any TS Null packets. The ingest module 152 stores the received VBR sequence of TS packets in the internal packet format (e.g., defined by internal packet header 180 of FIG. 6A or internal packet header 270 of FIG. 9A used with any of the methods described herein) so the delivery module 156 can deliver the stored internal packet as either a VBR or CBR packets (e.g., transport packets for a transport stream).

Referencing method 160 of FIG. 4, with respect to step 168, the ingest module 152 can insert one or more TS Null packets into the received VBR stream to generate a CBR stream. The CBR stream can then be stored using storage packets so that the data contained in the initially received VBR stream can be reconstructed as either a VBR or CBR stream. For example, if a VBR network packet for a VBR stream is received, the VBR network packet may contain seven TS packets, none of which are TS Null packets. The ingest module 152 determines where to insert TS Null packets within the overall sequence of packets of the VBR stream. This determination is made before constructing the storage packets with the null insertion information (e.g., steps 166 through 170). Based on an assigned peak rate for the received VBR stream, the ingest module 152 determines how many TS Null packets to insert between TS packets containing two successive PCRs. The successive PCRs may be contained within the same network packet or within different network packets. The ingest module 152 can determine how many TS Null packets to insert using, for example, Equation 1:

$$N_I = \frac{((PCR_B - PCR_A) \times VBR_P \div 27{,}000{,}000) - B_R}{188 \times 8} \quad \text{Equation 1}$$

where:
$N_I$=the number of TS Null packets to insert;
$PCR_A$=the first PCR value of two successive PCRs;
$PCR_B$=the second PCR value of the two successive PCRs;
$VBR_P$=the peak rate of the VBR stream; and
$B_R$=the number of received bits between the two successive PCRs, $PCR_A$ and $PCR_B$.
The ingest module 152 can insert $N_I$ TS Null packets between the TS packets containing $PCR_A$ and $PCR_B$. Then the storage packet can be created, for example, as described above with reference to FIGS. 6B, 9B, 12, and 15. If $N_I$ is not an integer value, it can be rounded to the nearest integer, though it will then be necessary to restamp $PCR_B$ to reflect the change in its transmission timing relative to $PCR_A$.

With further respect to step 168, the ingest module 152 can generate storage packets by identifying the number of TS Null packets to insert into the received VBR stream that are required to generate a CBR stream without actually inserting any TS Null packets into the received VBR stream. For example, the ingest module can calculate $N_I$, and use this information to generate the null packet insertion information (170) without actually inserting $N_I$ TS Null packets. The null packet insertion information includes data indicative of a reconstruction parameter of inserting $N_I$ TS Null packets. The storage packets can be generated according to any of the embodiments described herein.

In some examples, the network packets reconstructed by the delivery module 156 are CBR packets for CBR streams (e.g., reconstructed network packet 252 of FIG. 8, reconstructed network packet 372 of FIG. 11, reconstructed network packet 472 of FIG. 14, or reconstructed network packet 572 of FIG. 17). In other examples, the network packets reconstructed by the delivery module 156 are VBR packets for VBR streams. The VBR packets can be reconstructed, for example, without inserting any TS Null packets in the TS packet sequence. For example, with reference to the reconstructed network packet 252 of FIG. 8, the TS Packets 256 would not include Null 256A or Null 256B, but would only include TS Packets TS 0 through TS 4 in locations zero through four, respectively. The delivery module 156 can transmit the VBR sequence via network 158.

Advantageously, a CBR or VBR stream can be received and stored in a unified internal packet format. The internal packet format can then be delivered as either CBR or VBR. The processing is done on ingest, reducing the time and complexity required to deliver a stream. Multiple streams, either VBR or CBR, can be simultaneously delivered from the same storage packets, simplifying delivery and enhancing the robustness of the system.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include and/or can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

A computing device can include, for example, a computer, a computer with a browser device, a telephone, an IP phone, a mobile device (e.g., cellular phone, personal digital assistant (PDA) device, laptop computer, electronic mail device), a server, a rack with processing cards, and/or other communication devices. The browser device includes, for example, a computing device with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for storing a first transport stream, the method operable in a computer apparatus having circuitry forming at least one processor and at least one machine-readable storage device holding instructions for execution by the at least one processor, the method comprising:
   receiving a first sequence of packets associated with the first transport stream, the first sequence of packets having a network encapsulation and the first sequence of packets comprising a plurality of data packets and at least one null packet;
   removing the network encapsulation from the first sequence of packets;
   generating a storage packet comprising (i) a plurality of packet headers that include null packet insertion information and boundary information, and (ii) the plurality of data packets from the first sequence of packets, without the at least one null packet;
   wherein the null packet insertion information comprises a reconstruction parameter related to the number of null packets that were present in the first sequence of packets when received;
   wherein the boundary information comprises information that indicates a boundary of the storage packet;
   storing the storage packet across a plurality of storage blocks, the portion of the storage packet in each storage block including one of the plurality of packet headers and at least one of the plurality of data packets.

2. The method of claim 1, wherein the first sequence of packets is a sequence of transport packets comprising the plurality of data packets and the at least one null packet.

3. The method of claim 1, further comprising:
   generating a second sequence of packets associated with a second transport stream, at least by:
   (i) reading the plurality of storage blocks to obtain the storage packet, and
   (ii) inserting one or more null packets into the plurality of data packets in the storage packet as indicated by the null packet insertion information;
   adding network encapsulation to the second sequence of packets.

4. The method of claim 3, wherein:
   the first transport stream is a constant bit rate stream or a variable bit rate stream; and
   the second transport stream is a constant bit rate stream.

5. The method of claim 1, further comprising:
   generating a second sequence of packets associated with a second transport stream, at least by:
   (i) reading the plurality of storage blocks to obtain the storage packet, and
   (ii) not inserting null packets into the plurality of data packets in the storage packet;
   adding network encapsulation to the second sequence of packets.

6. The method of claim 5, wherein:
   the first transport stream is a constant bit rate stream or a variable bit rate stream; and
   the second transport stream is a variable bit rate stream.

7. The method of claim 1, wherein storing comprises storing the storage packet in a persistent memory.

8. The method of claim 1, wherein the plurality of storage blocks comprise a plurality of fixed-size storage blocks.

9. A system for storing a transport stream, the system comprising:
   a data storage device; and
   a processor in communication with the data storage device, the processor being configured to:
   receive a first sequence of packets associated with a first transport stream, the first sequence of packets having a network encapsulation and the first sequence of packets comprising a plurality of data packets and at least one null packet;
   remove the network encapsulation from the first sequence of packets;
   generate a storage packet comprising (i) a plurality of packet headers that include null packet insertion information and boundary information, (ii) the plurality of data packets from the first sequence of packets, without the at least one null packet;
   wherein the null packet insertion information comprises a reconstruction parameter related to the number of null packets that were present in the first sequence of packets when received;
   wherein the boundary information comprises information that indicates a boundary of the storage packet;
   store the storage packet across a plurality of storage blocks, the portion of the storage packet in each storage block including one of the plurality of packet headers and at least one of the plurality of data packets.

10. The system of claim 9, wherein the data storage device comprises a hard drive, a flash memory system, a data buffer, a transient data buffer, a queueing system, or a dynamic random access memory device, or any combination thereof.

11. The system of claim 9 wherein the processor is further configured to:
   generate a second sequence of packets associated with a second transport stream, at least by:

(i) reading the plurality of storage blocks to obtain the storage packet, and (ii) inserting one or more null packets into the plurality of data packets in the storage packet as indicated by the null packet insertion information;

add network encapsulation to the second sequence of packets.

12. The system of claim 9, wherein the processor is further configured to:

generate a second sequence of packets associated with a second transport stream, at least by:

(i) reading the plurality of storage blocks to obtain the storage packet, and (ii) not inserting null packets into the plurality of data packets in the storage packet; add network encapsulation to the second sequence of packets.

13. The system of claim 9, wherein the plurality of storage blocks comprise a plurality of fixed-size storage blocks.

14. A computer program product, embodied in a non-transitory computer readable medium, the computer program product including instructions being operable to cause a data processing apparatus to:

receive a first sequence of packets associated with a first transport stream, the first sequence of packets having a network encapsulation and the first sequence of packets comprising a plurality of data packets and at least one null packet;

remove the network encapsulation from the first sequence of packets;

generate a storage packet comprising (i) a plurality of packet headers that include null packet insertion information and boundary information, (ii) the plurality of data packets from the first sequence of packets, without the at least one null packet;

wherein the null packet insertion information comprises a reconstruction parameter related to the number of null packets that were present in the first sequence of packets when received;

wherein the boundary information comprises information that indicates a boundary of the storage packet;

store the storage packet across a plurality of storage blocks, the portion of the storage packet in each storage block including one of the plurality of packet headers and at least one of the plurality of data packets.

15. The computer program product of claim 14, wherein the plurality of storage blocks comprise a plurality of fixed-size storage blocks.

16. A system comprising:

means for receiving a first sequence of packets associated with a first transport stream, the first sequence of packets having a network encapsulation and the first sequence of packets comprising a plurality of data packets and at least one null packet;

means for removing the network encapsulation from the first sequence of packets;

means for generating a storage packet comprising (i) a plurality of packet headers that include null packet insertion information and boundary information, (ii) the plurality of data packets from the first sequence of packets, without the at least one null packet;

wherein the null packet insertion information comprises a reconstruction parameter related to the number of null packets that were present in the first sequence of packets when received;

wherein the boundary information comprises information that indicates a boundary of the storage packet;

means for storing the storage packet across a plurality of storage blocks, the portion of the storage packet in each storage block including one of the plurality of packet headers and at least one of the plurality of data packets.

* * * * *